(12) United States Patent
Kashibuchi et al.

(10) Patent No.: US 11,563,871 B2
(45) Date of Patent: Jan. 24, 2023

(54) INFORMATION PROCESSING APPARATUS, CONTROL METHOD, AND PRODUCT PERFORMING MULTIPLEXING PROCESSING CHANGING A COMPONENT IN DIFFERENT COLOR SPACES WITH RESPECT TO PRINTING AND NON-PRINTING AREAS

(71) Applicant: CANON KABUSHIKI KAISHA, Tokyo (JP)

(72) Inventors: Yoichi Kashibuchi, Kanagawa (JP); Akitoshi Yamada, Kanagawa (JP); Hiroyasu Kunieda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/592,344

(22) Filed: Feb. 3, 2022

(65) Prior Publication Data
US 2022/0263970 A1 Aug. 18, 2022

(30) Foreign Application Priority Data

Feb. 12, 2021 (JP) .............................. JP2021-020974

(51) Int. Cl.
*H04N 1/32* (2006.01)
*H04N 1/60* (2006.01)

(52) U.S. Cl.
CPC ....... *H04N 1/32309* (2013.01); *H04N 1/6008* (2013.01)

(58) Field of Classification Search
CPC ....... H04N 1/32144–32352; H04N 1/60–6008
See application file for complete search history.

(56) References Cited

U.S. PATENT DOCUMENTS 8,300,925 B2 * 10/2012 Kunieda ............... G06T 1/0028
382/209
2019/0005601 A1 * 1/2019 Ishida ...................... H04N 1/54

FOREIGN PATENT DOCUMENTS

JP        2000305429 A     11/2000
JP        2019009734 A * 1/2019

OTHER PUBLICATIONS

Translation of JP-2019009734-A (Year: 2019).*

* cited by examiner

*Primary Examiner* — Scott A Rogers
(74) *Attorney, Agent, or Firm* — Canon U.S.A., Inc. IP Division

(57) ABSTRACT

An information processing apparatus includes a determination unit configured to determine a printing area and a non-printing area in image data, and an execution unit configured to execute first multiplexing processing by changing a U component in a YUV color space with respect to an area determined as a printing area in the image data and to execute second multiplexing processing by changing a Y component in a CMYK color space with respect to an area determined as a non-printing area in the image data.

7 Claims, 24 Drawing Sheets

FIG.6

| NUMBER | BEFORE CONVERSION | | | AFTER CONVERSION | | |
|---|---|---|---|---|---|---|
| | R | G | B | R' | G' | B' |
| 1 | 0 | 0 | 0 | 0 | 0 | 5 |
| 2 | 0 | 0 | 16 | 0 | 5 | 32 |
| ⋮ | ⋮ | ⋮ | ⋮ | ⋮ | ⋮ | ⋮ |
| 16 | 0 | 0 | 240 | 0 | 65 | 229 |
| 17 | 0 | 0 | 255 | 0 | 66 | 238 |
| 18 | 0 | 16 | 0 | 3 | 40 | 0 |
| ⋮ | ⋮ | ⋮ | ⋮ | ⋮ | ⋮ | ⋮ |
| 289 | 0 | 255 | 255 | 4 | 240 | 239 |
| 290 | 16 | 0 | 0 | 30 | 0 | 1 |
| ⋮ | ⋮ | ⋮ | ⋮ | ⋮ | ⋮ | ⋮ |
| 4913 | 255 | 255 | 255 | 255 | 255 | 255 |

FIG.7

| NUMBER | INPUT | | | U APPLICATION VALUE | | |
|---|---|---|---|---|---|---|
| | Y | U | V | 0 | 2 | -1 |
| 1 | 0 | -128 | -128 | -118 | -108 | -128 |
| 2 | 0 | -128 | -112 | -118 | -108 | -128 |
| ⋮ | ⋮ | ⋮ | ⋮ | ⋮ | ⋮ | ⋮ |
| 16 | 0 | -128 | 112 | -118 | -108 | -128 |
| 17 | 0 | -128 | 127 | -118 | -108 | -128 |
| 18 | 0 | -112 | 0 | -112 | -102 | -122 |
| ⋮ | ⋮ | ⋮ | ⋮ | ⋮ | ⋮ | ⋮ |
| 289 | 0 | 127 | 127 | 117 | 127 | 107 |
| 290 | 16 | -128 | -128 | -118 | -108 | -128 |
| ⋮ | ⋮ | ⋮ | ⋮ | ⋮ | ⋮ | ⋮ |
| 4913 | 255 | 127 | 127 | 117 | 127 | 107 |

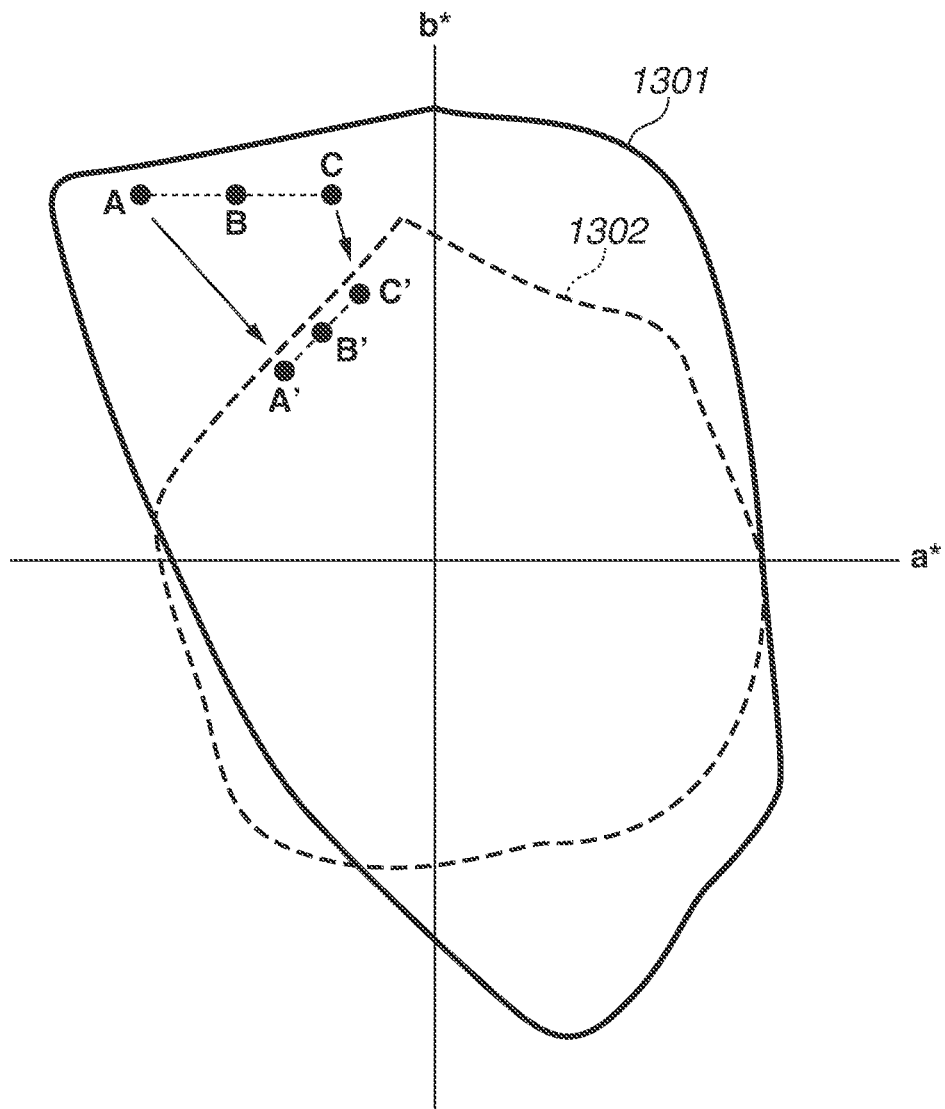

FIG.14A

| 0  | 0  | 0  | -1 | -1 |
|----|----|----|----|----|
| 0  | -1 | -1 | -2 | -2 |
| -1 | 2  | 2  | -1 | -1 |
| -1 | -1 | -1 | 0  | 0  |
| 2  | 0  | 0  | 0  | 0  |

FIG.14B

| 0  | 0  | -1 | 2  | -1 |
|----|----|----|----|----|
| 0  | 0  | -1 | 2  | -1 |
| 0  | -1 | 2  | -1 | 0  |
| 0  | -1 | 2  | -1 | 0  |
| -1 | 2  | -1 | 0  | 0  |

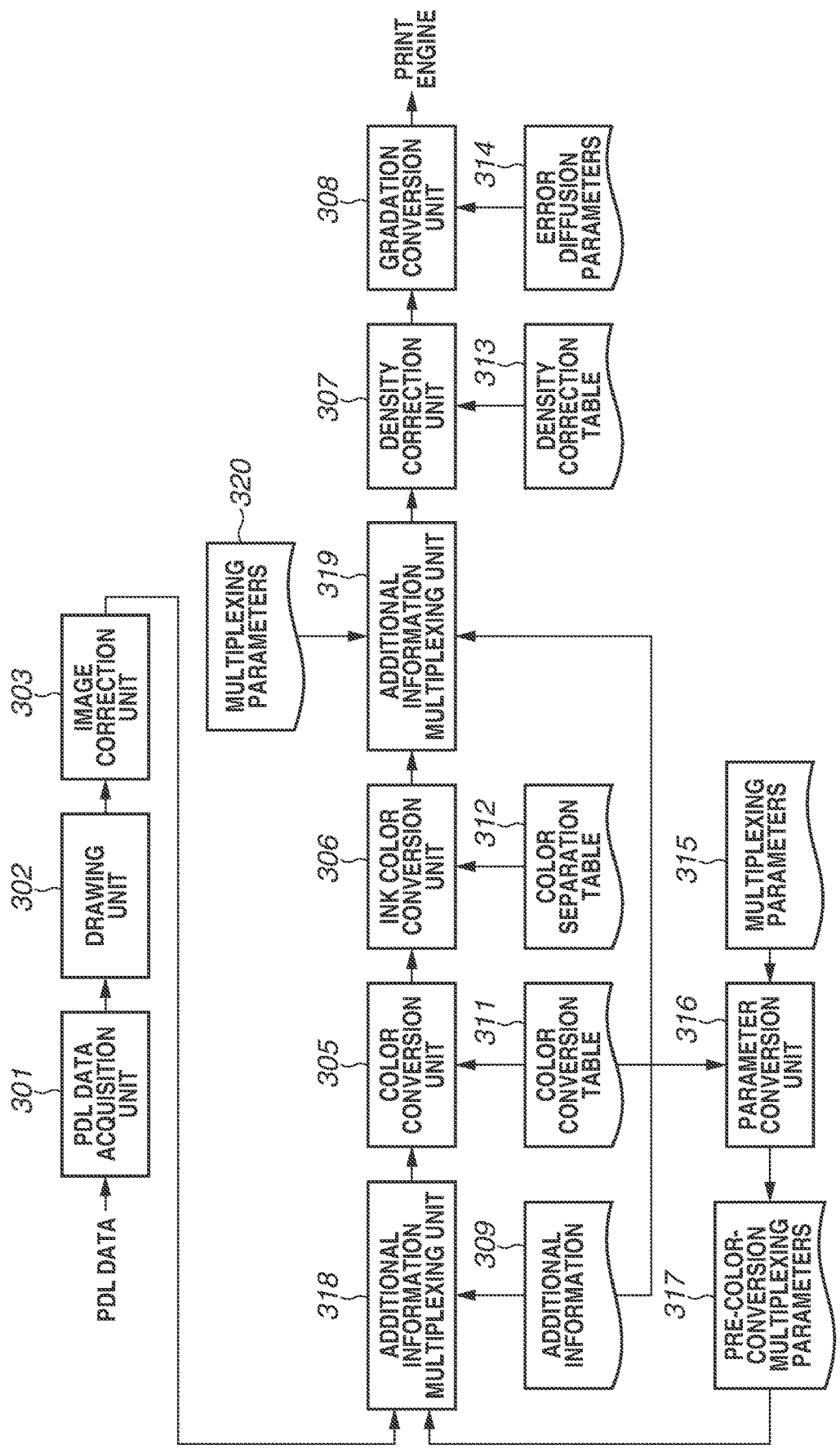

FIG.20

| NUMBER | INPUT | | | RGB APPLICATION VALUE (0) | | | RGB APPLICATION VALUE (2) | | | RGB APPLICATION VALUE (-1) | | |
|---|---|---|---|---|---|---|---|---|---|---|---|---|
| | R | G | B | R | G | B | R | G | B | R | G | B |
| 1 | 0 | 0 | 0 | 3 | 2 | 5 | 11 | 6 | 65 | 24 | 22 | 1 |
| 2 | 0 | 0 | 16 | 11 | 10 | 32 | 25 | 5 | 109 | 18 | 22 | 4 |
| ... | ... | ... | ... | ... | ... | ... | ... | ... | ... | ... | ... | ... |
| 16 | 0 | 0 | 240 | 2 | 4 | 220 | 18 | 22 | 255 | 3 | 40 | 45 |
| 17 | 0 | 0 | 255 | 3 | 9 | 242 | 17 | 25 | 255 | 2 | 32 | 48 |
| 18 | 0 | 16 | 0 | 2 | 25 | 11 | 26 | 24 | 62 | 13 | 33 | 5 |
| ... | ... | ... | ... | ... | ... | ... | ... | ... | ... | ... | ... | ... |
| 289 | 0 | 255 | 255 | 2 | 245 | 246 | 22 | 190 | 255 | 3 | 240 | 128 |
| 290 | 16 | 0 | 0 | 37 | 3 | 8 | 27 | 5 | 70 | 41 | 32 | 2 |
| ... | ... | ... | ... | ... | ... | ... | ... | ... | ... | ... | ... | ... |
| 4913 | 255 | 255 | 255 | 240 | 242 | 245 | 239 | 240 | 255 | 247 | 248 | 190 |

FIG.24

| NUMBER | INPUT | | | RGB APPLICATION VALUE (0/-1) | | | RGB APPLICATION VALUE (2) | | |
|---|---|---|---|---|---|---|---|---|---|
| | R | G | B | R | G | B | R | G | B |
| 1 | 0 | 0 | 0 | 0 | 0 | 0 | 11 | 6 | 65 |
| 2 | 0 | 0 | 16 | 0 | 0 | 16 | 25 | 5 | 109 |
| ... | ... | ... | ... | ... | ... | ... | ... | ... | ... |
| 16 | 0 | 0 | 240 | 0 | 0 | 240 | 18 | 22 | 255 |
| 17 | 0 | 0 | 255 | 0 | 0 | 255 | 17 | 25 | 255 |
| 18 | 0 | 16 | 0 | 0 | 16 | 0 | 26 | 24 | 62 |
| ... | ... | ... | ... | ... | ... | ... | ... | ... | ... |
| 289 | 0 | 255 | 255 | 0 | 255 | 255 | 22 | 190 | 255 |
| 290 | 16 | 0 | 0 | 16 | 0 | 0 | 27 | 5 | 70 |
| ... | ... | ... | ... | ... | ... | ... | ... | ... | ... |
| 4913 | 255 | 255 | 255 | 255 | 255 | 255 | 255 | 255 | 230 |

# INFORMATION PROCESSING APPARATUS, CONTROL METHOD, AND PRODUCT PERFORMING MULTIPLEXING PROCESSING CHANGING A COMPONENT IN DIFFERENT COLOR SPACES WITH RESPECT TO PRINTING AND NON-PRINTING AREAS

BACKGROUND

Field

Aspects of the present disclosure generally relate to an information processing apparatus for multiplexing additional information, a control method therefor, and a storage medium.

Description of the Related Art

There is known a digital watermarking technique in which additional information other than an image is embedded (hereinafter referred to as "multiplexed") in an image. In some implementations of digital watermarking technique, for example, additional information such as an author name or approval or disapproval of licensing of a photograph or picture is multiplexed in the photograph or picture in a manner unlikely to be visually discriminate. Moreover, regarding the field of application thereof, along with the advancement of high image quality of an image output apparatus, such as a copying machine or a printer, there is known a technique of multiplexing additional information in an image to identify an output apparatus and its apparatus number from an image output onto a sheet of paper for the purpose of preventing forgery of, for example, bank bills, stamps, or valuable papers. Moreover, to extract additional information multiplexed in an image output onto a sheet of paper, there is known a technique of performing image capturing of a target output product by an imaging device, such as a scanner or a built-in camera of a portable terminal, and analyzing the captured image to extract the multiplexed additional information.

As a method of multiplexing additional information in an image, there is known a technique of embedding a pattern obtained by modulating colors in local regions of the image. Japanese Patent Application Laid-Open No. 2000-305429 discusses a method of dividing an image into blocks each including 16 pixels (4×4 pixels) and then setting one half of the 16 pixels to "original pixels+1" and setting the other half of 16 pixels to "original pixels−1". The method prints an image and analyzes modulation of increase and decrease of pixels of each block of a captured image obtained by an imaging device, thus being able to extract the multiplexed additional information. Moreover, since the method performs an increase and decrease of pixels in local regions, the printed pixels are averaged and become unlikely to be visually discriminated. Additionally, Japanese Patent Application Laid-Open No. 2000-305429 also discusses switching to a method of not multiplexing additional information but embedding legible characters directly in an image, depending on the condition of an image, for example, in the case of an image other than image data.

However, there may be a case where multiplexing processing that is to be performed for a printing area is unsuitable for a non-printing area. For example, a technique of performing multiplexing processing using a method of changing a U component in the YUV color space and maintaining the other components is unsuitable for a non-printing area. This is because, with regard to a non-printing area (blank area), it is impossible to change only a U component without greatly changing Y and V components.

SUMMARY

According to various embodiments of the present disclosure, an information processing apparatus includes a determination unit configured to determine a printing area and a non-printing area in image data, and an execution unit configured to execute first multiplexing processing by changing a U component in a YUV color space with respect to an area determined as a printing area in the image data and to execute second multiplexing processing by changing a Y component in a CMYK color space with respect to an area determined as a non-printing area in the image data.

Further features of the present disclosure will become apparent from the following description of example embodiments with reference to the attached drawings.

BRIEF DESCRIPTION OF THE DRAWINGS

FIG. 6 is a diagram illustrating a color conversion table.

FIG. 7 is a diagram illustrating a table of multiplexing parameters.

FIG. 13 is a diagram illustrating color conversion.

FIGS. 14A and 14B are diagrams each illustrating a mask pattern.

FIG. 17 is a diagram illustrating a block configuration of firmware for multiplexing encode processing.

FIG. 20 is a diagram illustrating a table of multiplexing parameters.

FIG. 24 is a diagram illustrating a table of multiplexing parameters.

DESCRIPTION OF THE EMBODIMENTS

Figure 1A:
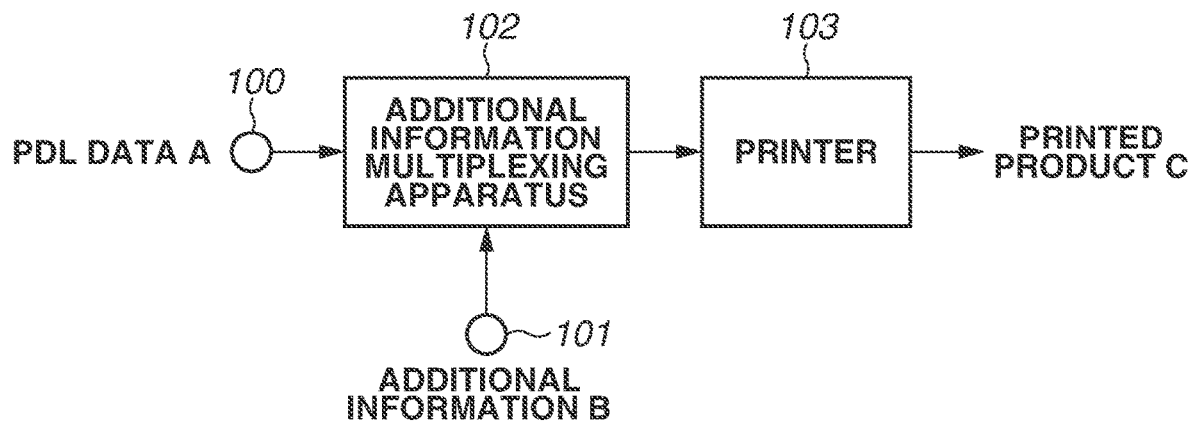
FIGS. 1A and 1B are diagrams each illustrating a hardware configuration of an image processing apparatus which performs multiplexing encode processing.

Various example embodiments, features, and aspects of the present disclosure will be described in detail below with reference to the drawings. Furthermore, the following example embodiments are not intended to limit the invention set forth in the claims, and not all of the combinations of features described in the following example embodiments are necessarily essential for every solution of embodiments of the present disclosure. Furthermore, the same constituent elements are assigned the respective same reference characters, and any duplicate description thereof is omitted.

Figure 1B:
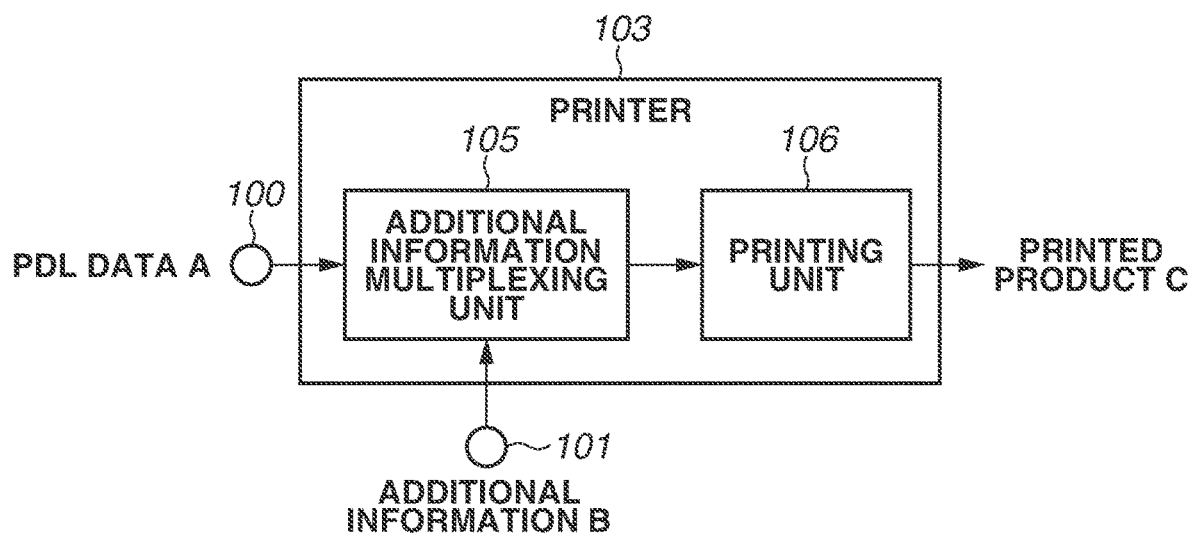

FIGS. 1A and 1B are diagrams each illustrating a hardware configuration of an image processing apparatus which performs multiplexing encode for embedding additional information in image information according to a first example embodiment. The image processing apparatus acquires page description language (PDL) data A and additional information B, and generates a printed product C with the additional information B embedded in the PDL data A. FIG. 1A illustrates a configuration in which processing for embedding the additional information B in the PDL data A is performed by an additional information multiplexing apparatus 102, which is provided separately from a printer 103. FIG. 1B illustrates a configuration in which processing for embedding the additional information B in the PDL data A is performed inside the printer 103.

Referring to FIG. 1A, the PDL data A is input via an input terminal 100. The PDL data A is drawing data including a drawing instruction for an object described in a page description language (PDL) (hereinafter referred to as "PDL data"). Moreover, the additional information B is input via an input terminal 101. The additional information B represents text document data, audio data, still image data, or moving image data. Alternatively, the additional information B represents data obtained by compressing text document information, audio information, still image information, or moving image information or data converted into different binary values. The additional information multiplexing apparatus 102 is an apparatus which performs processing for embedding the additional information B in the PDL data A. Details of the additional information multiplexing processing are described below. The printer 103 prints image data with the additional information B embedded in the PDL data A, thus generating the printed product C.

Figure 19:
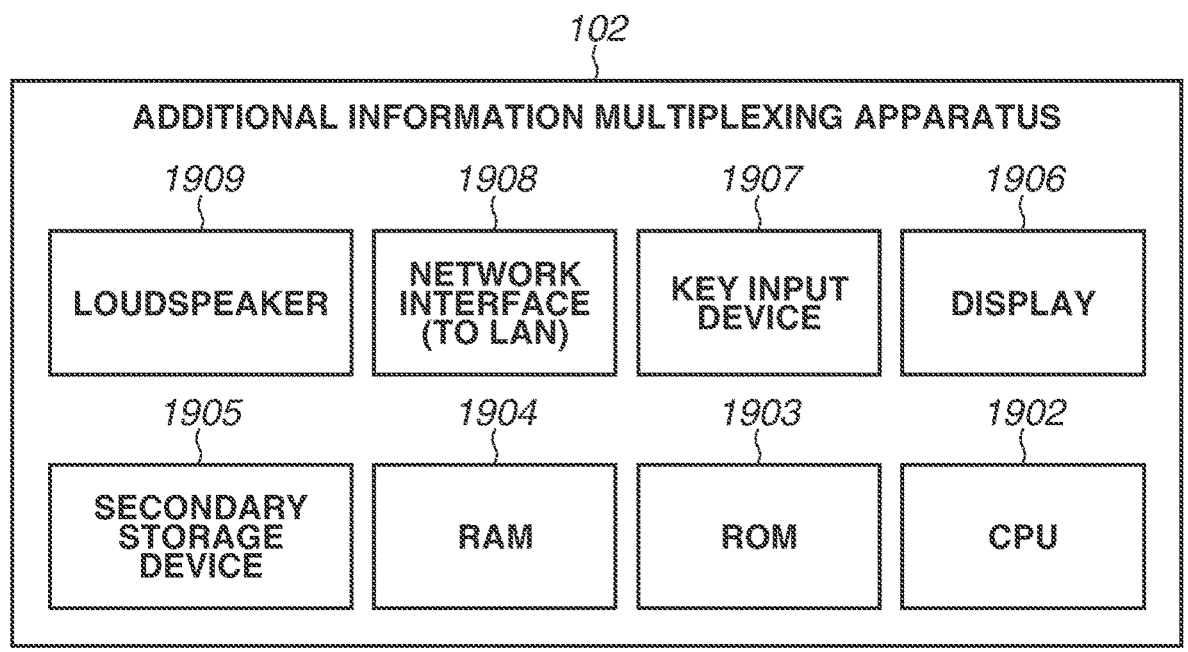
FIG. 19 is a diagram illustrating a hardware configuration of an additional information multiplexing apparatus.

FIG. 19 is a diagram used to explain a hardware configuration example of the additional information multiplexing apparatus 102 illustrated in FIG. 1A. A central processing unit (CPU) 1902 executes processing for multiplexing, for example, additional information according to a program. A read-only memory (ROM) 1903 stores a program which is to be executed by the CPU 1902. A random access memory (RAM) 1904 provides a memory for temporarily storing various pieces of information at the time of a program being executed by the CPU 1902. A secondary storage device 1905 is, for example, a hard disk and is a storage medium for storing, for example, an image file and additional information.

A display 1906 displays, for example, a user interface screen and processing details. A key input device 1907 receives, for example, an instruction for processing, settings, and inputting of characters via an operation performed on a device such as a keyboard. A network interface 1908 is connected to, for example, a local area network (LAN). Moreover, the LAN is connected to the Internet. The CPU 1902 accesses a site connected to the Internet via the network interface 1908, causes the display 1906 to display a screen of the site, and transmits and receives data with respect to the site. The additional information multiplexing apparatus 102 is an information processing apparatus such as a personal computer (PC) or a smartphone, but can be another type of apparatus as long as it is capable of performing for embedding the additional information B in the PDL data A.

FIG. 1B illustrates a configuration in which an additional information multiplexing unit 105, which is equivalent to the additional information multiplexing apparatus 102, is included in the printer 103. As with FIG. 1A, PDL data A is input via an input terminal 100. Additional information B is input via an input terminal 101. The additional information multiplexing unit 105 included in the printer 103 performs processing for embedding the additional information B in the PDL data A. Moreover, a printing unit 106 prints image data with the additional information B embedded in the PDL data A by the additional information multiplexing unit 105, thus generating a printed product C.

The method of printing image data with the additional information B embedded in the PDL data A and thus generating the printed product C, as illustrated in FIGS. 1A and 1B, is hereinafter referred to as "multiplexing encode processing".

Figure 2:
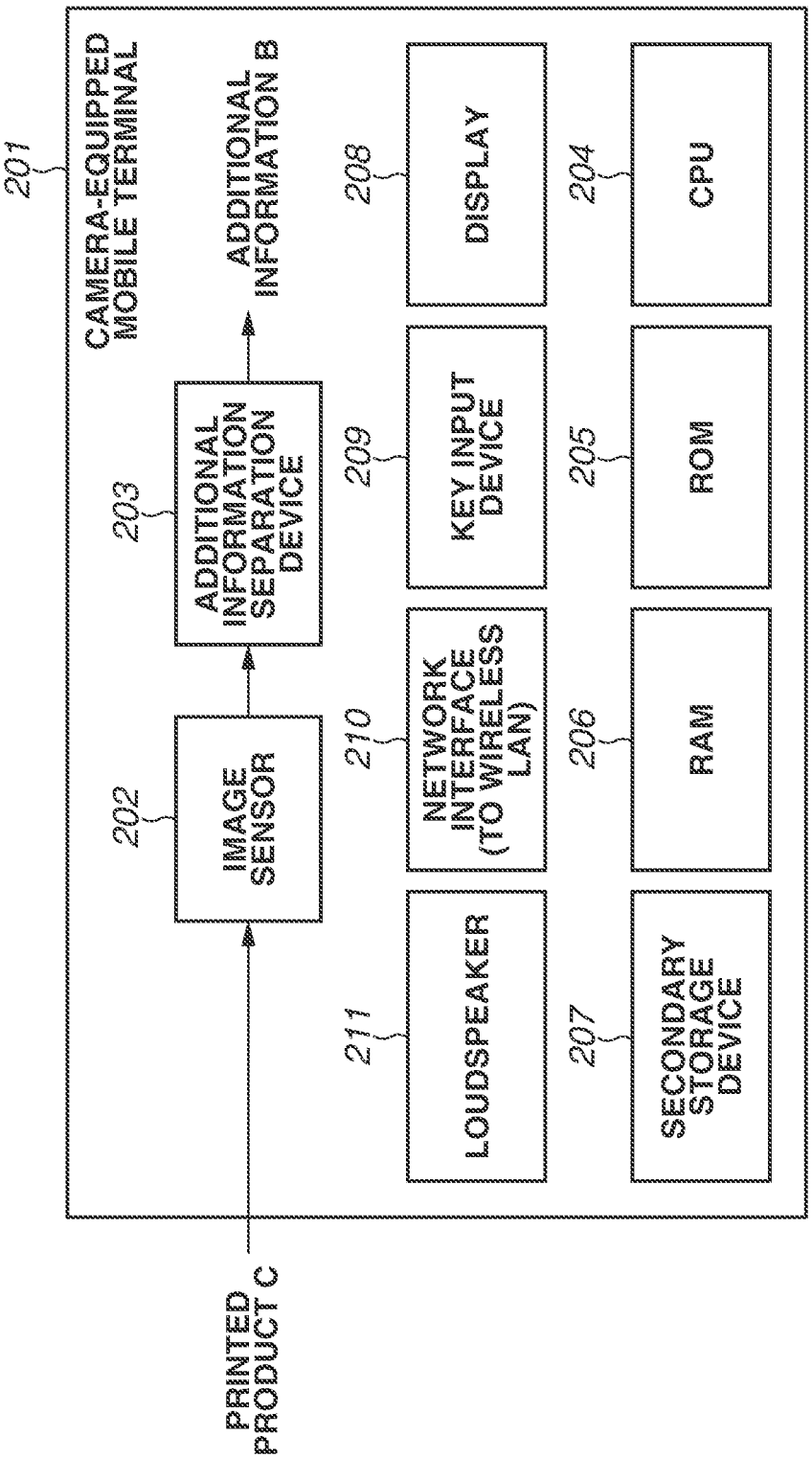
FIG. 2 is a diagram illustrating a hardware configuration of an image processing apparatus which performs multiplexing decode processing.

FIG. 2 is a diagram illustrating a hardware configuration of an image processing apparatus which performs multiplexing decode for extracting additional information from image information according to the first example embodiment. FIG. 2 illustrates an apparatus which extracts the embedded additional information B by performing, with an imaging apparatus such as a camera, image capturing of a printed product C with multiplexing encode processing performed thereon and analyzing the captured image. Referring to FIG. 2, a camera-equipped mobile terminal 201 includes an image sensor 202 and has the function of performing image capturing of the printed product C. An additional information separation device 203 extracts additional information B by analyzing an image captured by the image sensor 202. Details of the additional information extraction processing are described below.

A CPU 204 executes an information processing method described in the first example embodiment according to a program. A ROM 205 stores a program which is to be executed by the CPU 204. A RAM 206 provides a memory for temporarily storing various pieces of information at the time of a program being executed by the CPU 204. A secondary storage device 207 is, for example, a hard disk and is a storage medium for storing, for example, a database for storing image files and image analysis results.

A display 208 displays, to the user, the extracted additional information, which is a processing result in the first example embodiment. A key input device 209 is implemented, for example, by the display 208 including a touch panel function and receives, for example, an instruction for processing, settings, and inputting of characters via an operation performed on the touch panel. A network interface 210 is connected to, for example, a wireless local area network (LAN). Moreover, the wireless LAN is connected to the Internet. The CPU 204 accesses a site connected to the Internet via the network interface 210, causes the display 208 to display a screen of the site, and transmits and receives data with respect to the site.

A loudspeaker 211 outputs sound in a case where the extracted additional information is audio data or moving image data with audio. Moreover, in a case where there is moving image data at an access destination connected via the Internet, the loudspeaker 211 outputs sound reproduced from the moving image data. The camera-equipped mobile terminal 201 includes the image sensor 202 incorporated therein, but is not limited to such a configuration. For example, a configuration in which another apparatus controls the image sensor 202 and transmits a captured image to the additional information separation device 203 can also be employed. For example, a configuration in which a digital camera or a video camera is used as the image sensor 202 and a personal computer or a smartphone is used as the additional information separation device 203 to extract additional information B from the printed product C can also be employed.

The method of extracting additional information B from the printed product C, as illustrated in FIG. 2, is hereinafter referred to as "multiplexing decode processing".

<Description of Multiplexing Encode Processing>

Figure 3:
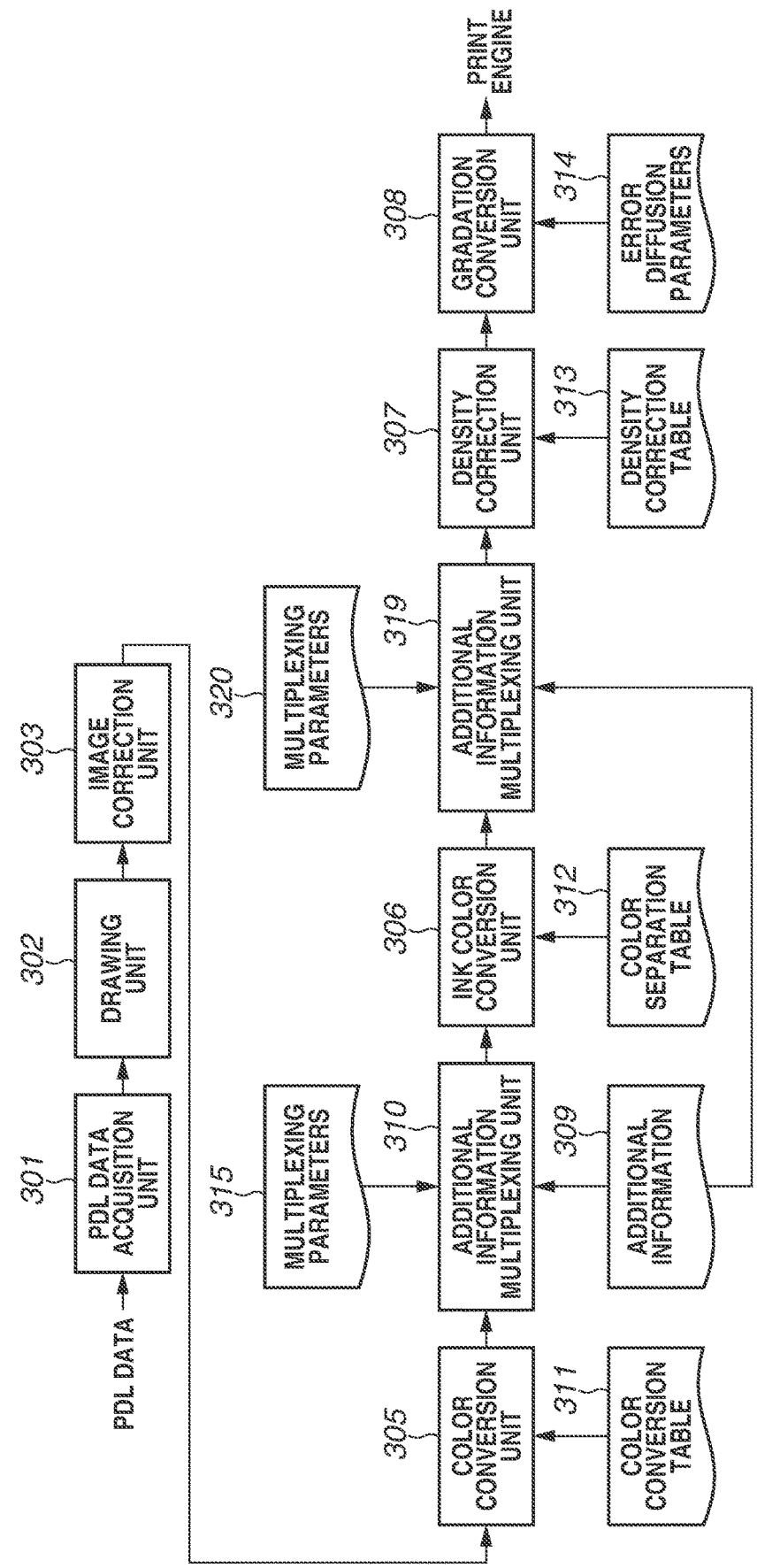
FIG. 3 is a diagram illustrating a block configuration of firmware for multiplexing encode processing.

FIG. 3 is a diagram illustrating a block configuration of basic firmware for multiplexing encode processing according to the first example embodiment. Image data undergoes processing described below, is converted into a resolution and a gradation number which a print engine connected to a recording head is able to process, and is then transmitted. Various processing units illustrated in FIG. 3 are described.

A PDL data acquisition unit 301 acquires PDL data via the input terminal 100. The PDL data is data composed of a drawing instruction for an object. The acquired PDL data is transmitted to a drawing unit 302.

The drawing unit 302 interprets the PDL data received from the PDL data acquisition unit 301 and generates image data of the bitmap format (herein assumed to be image data in an RGB color space) and its attribute data. The attribute data is attribute information about a drawing instruction for an object, which is generated for each pixel. The attribute information in this case is determined based on the following criteria.

In the case of being specified by a character drawing command (character type or character encoding): character attribute.

In the case of being specified by a line drawing command (coordinate points, length, and width): line attribute.

In the case of being specified by a graphic drawing command (rectangle, shape, and coordinate points): graphic attribute.

In the case of being specified by an image drawing command (aggregate of points): image attribute.

The generated image data of the bitmap format is transmitted to an image correction unit 303.

The image correction unit 303 performs image correction on the RGB image data acquired by the drawing unit 302. The image correction includes, for example, brightness adjustment for making the whole color brighter or darker, contrast adjustment, and color balance adjustment.

A color conversion unit 305 performs conversion processing in such a way as to bring the color to be output by the printer 103 into an appropriate color. For example, in a case where an image displayed by a display device is to be printed by a printer, the color gamut does not necessarily match between the display device and the printer. With respect to a certain color, the printer may be narrower in color gamut, and, with respect to another color, the opposite may apply. Therefore, it is necessary to minimize deterioration of an image and perform color compression or expansion as appropriate.

In the first example embodiment, the color conversion unit 305 performs conversion in the RGB format. Thus, the color conversion unit 305 converts RGB values input thereto into RGB values directed to a printer (hereinafter referred to as "DeviceRGB values") in view of reproducibility of a device. While the conversion can be performed by an arithmetic operation of, for example, a matrix, in the first example embodiment, a three-dimensional color conversion table 311 is used therefor.

In a case where RGB values to be input are assumed to be 8 bits (256 gradations) for each color, since storing all of the combinations is not realistic from the viewpoint of a capacity, the color conversion table 311 to be used is the one obtained by performing thinning out at predetermined intervals. FIG. 6 illustrates an example of the color conversion table 311. The table illustrated in FIG. 6 is a table in which 256 gradations for each color are assumed to be 17 grid points and DeviceRGB values corresponding to such grid points are described (17×17×17=4,913 grid points). Each value between adjacent grid points is calculated by interpolation processing. The interpolation processing can be performed with use of a known technique such as tetrahedral interpolation.

While, as mentioned above, DeviceRGB values corresponding to the target RGB values are calculated, the output can be set as 8 bits or more in view of gradation characteristics. Moreover, since the color conversion table depends on the color gamut of the printer 103 as mentioned above, for example, in a case where different recording sheets of paper are used for recording, tables corresponding to the respective recording sheets of paper are prepared. Furthermore, while, in the first example embodiment, color spaces for color conversion are described with respect to conversion from RGB to RGB, the description also applies to color spaces for color conversion, for example, from CMYK to CMYK, from RGB to CMYK, and from CMYK to RGB.

An ink color conversion unit 306 converts the DeviceRGB values obtained by conversion performed by the color conversion unit 305 into ink color values. In this conversion, a color separation table 312 in which ink color values corresponding to the respective DeviceRGB values are previously described is used. Furthermore, even in the ink color conversion unit 306, as with the color conversion unit 305, a table for 17 grid points is used.

In the first example embodiment, ink colors are assumed to be four colors, i.e., cyan (C), magenta (M), yellow (Y), and black (K), and a table in which values for four colors corresponding to the respective grid points are described is used. As with the above-mentioned color conversion table 311, values between adjacent grid points obtained by ink color separation corresponding to target DeviceRGB values are obtained by applying, for example, tetrahedral interpolation.

A density correction unit 307 performs correction for each of colors C, M, Y, and K. Herein, a one-dimensional density correction table 313 is used. For example, a table corresponding to input 8 bits (256 gradations) for each color is prepared in advance.

A gradation conversion unit 308 converts multibit data obtained by performing ink color conversion and density correction into gradation numbers which the printer 103 is able to use to perform printing. Here, for the sake of explanation of gradation conversion processing, the printer 103 is described as using two gradations of recording (1) and non-recording (0) (1 bit). The gradation conversion method to be used includes an error diffusion method, which is capable of excluding low-frequency components of an image and performing gradation reproduction suitable for visual sensation. Moreover, the input signal is described as having 8-bit values of "0" to "255".

Here, an error distribution method in the error diffusion method is described. In a case where the signal value of a target pixel is assumed to be a signal value L, a comparison between the signal value L and a threshold value TH is made. To represent each of "0" to "255" in binary notation, the threshold value is set to "127". Depending on the magnitude relationship in the result of comparison, in the case of L>TH, 1 (recording) is determined, and, in the case of L≤TH, 0 (non-recording) is determined. Then, according to the result of determination, a quantization representative value V is set to "255" in the case of 1 (recording) and is set to "0" in the case of 0 (non-recording). An error E (=L−V) occurring at that time is distributed to adjacent pixels according to a distribution coefficient. Then, a value La obtained by adding the distributed error Ea to the signal value L of a next target pixel is compared with the threshold value TH. Accordingly, in the case of La>TH, 1 (recording) is determined, and, in the case of La≤TH, 0 (non-recording) is determined. Performing this processing on all of the pixels and all of the ink colors C, M, Y, and K enables obtaining 1-bit ink color data which is recordable. The gradation conversion unit 308 transmits the generated ink color data to a print engine.

The print engine includes a reception memory, which stores the received data, a CPU, and a printing unit, which applies recording materials to a recording medium. The print engine stores the input ink color data in the reception memory. The printing unit converts the ink color data into ink droplet data corresponding to nozzles of a recording head. Print processing is performed by the recording head, which performs a scanning operation in directions intersecting with the conveyance direction of a recording medium, ejecting ink droplets corresponding to the ink droplet data onto the recording medium. While, in the first example embodiment, a configuration of a serial scanning type inkjet recording apparatus is illustrated, the illustrated configuration can also be applied to another type of recording apparatus, such as a recording apparatus using a line head or a recording apparatus using a laser engine.

Additional information 309 represents information to be embedded in the input PDL data A by the additional information multiplexing apparatus 102 illustrated in FIG. 1A or the additional information multiplexing unit 105 illustrated in FIG. 1B. For example, the additional information 309 is assumed to be text document data, such as numerical data obtained by allocating numerals or characters to numerical values using character encoding. The numerical data is transmitted as the additional information 309 illustrated in FIG. 3 to an additional information multiplexing unit 310.

For example, information indicating "hello" is described as the text document data. The text document data is assumed to be treated as numerical data, which is called binary data. The binary data is information indicating "0" or "1" and such information indicating "0" or "1" being continued in sequence represents a specific meaning. While characters are normally treated on a PC, corresponding binary data is defined with respect to each character. What character corresponds to what binary data is defined by information called "character encoding". Taking "Shift Japanese Industrial Standards (Shift JIS)", which is one of character encodings, as an example, "h" corresponds to binary data "01101000". Similarly, "e" corresponds to binary data "01100101", "l" corresponds to binary data "01101100" and "o" corresponds to binary data "01101111".

Characters "hello" are able to be represented as "0110100001100101011011000110110001101111" in binary data. On the other hand, if binary data "0110100001100101011011000110110001101111" is able to be acquired, characters "hello" are able to be acquired. The additional information 309 is assumed to be numerical data converted into such binary data.

The additional information multiplexing unit 310 receives attribute data obtained by the drawing unit 302, the additional information 309, and multiplexing parameters 315, and performs processing for multiplexing the additional information 309 to image data. The additional information multiplexing unit 310 performs multiplexing processing on only pixels having any attribute information about any one of character attribute, line attribute, graphic attribute, and image attribute in the attribute data. Thus, the additional information multiplexing unit 310 performs multiplexing processing on a printing area in which any printing is performed at the stage of drawing and does not perform multiplexing processing on a non-printing area which is equivalent to, for example, a background. The multiplexing processing is processing for embedding, in image data, additional information 309 obtained by converting, for example, a text document into binary data of "0" and "1" in a format which is able to be extracted and read at a subsequent stage. For example, to make the additional information 309 into a format in which "0" and "1" are readable, the multiplexing processing performs mask processing on image data to cause an image area to have two periodicities.

Figure 11A:
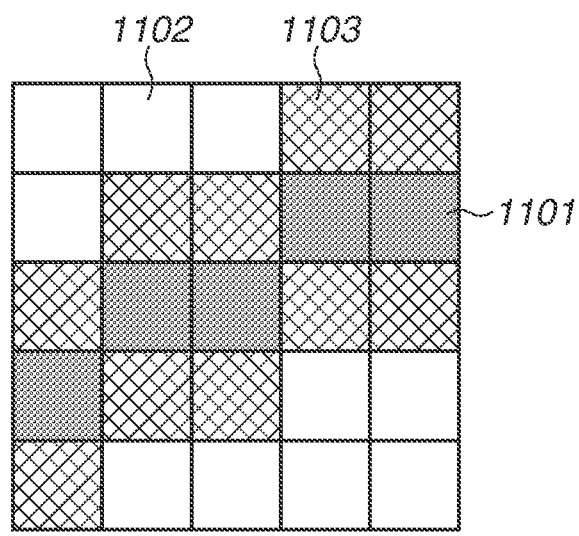
FIGS. 11A and 11B are conceptual diagrams of mask data.
Figure 11B:
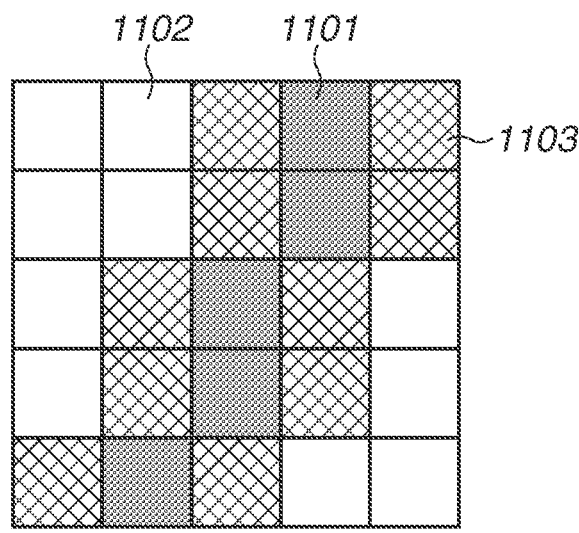

FIGS. 11A and 11B illustrate an example of mask data for assigning two periodicities. FIGS. 11A and 11B are image diagrams of master data. Each of FIGS. 11A and 11B illustrates mask data composed of 5 pixels (px)×5 px, and "0" and "1" are represented by multiplying an image by a pattern having two periodicities with respect to an area with 5 px×5 px. If two periodicities are able to be determined by, for example, frequency analysis at the time of reading of an image, "0" and "1" are able to be read.

The additional information multiplexing unit 310 implements multiplexing by forming a pattern on an image based on numerical data about additional information to be embedded. For example, as an example of embedding additional information in an image, a method of applying "0" and "1" alternately to the whole image represented by unicolored, gray, image data is described.

The size of an image on which to perform multiplexing is assumed to be 640 px in vertical width×480 px in horizontal width. Moreover, the mask data is assumed to be mask data composed of 5 px×5 px as with that illustrated in FIGS. 11A and 11B. Here, a pattern illustrated in FIG. 11A is defined as "0" and a pattern illustrated in FIG. 11B is defined as "1".

For example, the mask data is defined by being divided into black blocks 1101, white blocks 1102, and cross-hatched blocks 1103 as illustrated in FIGS. 11A and 11B. As each numerical value, the black block 1101 is assumed to be +2, the white block 1102 is assumed to be 0, and the cross-hatched block 1103 is assumed to be −1.

In the following code, in a case where "maskA" is true, the mask data is shown as "0" as illustrated in FIG. 11A, and, in a case where "maskA" is false, the mask data is shown as "1" as illustrated in FIG. 11B. Pseudocode obtained by applying the respective numerical values of black, white, and cross-hatched blocks illustrated in FIGS. 11A and 11B as mask data to the whole image is shown as follows.

```
Pseudocode:
1  int i, j, k, l;
2  int width = 640, height = 480;
3  unsigned char *data = image data;
4  int **maskA = mask data;
6  bool isMaskA = true;
5  for(j = 0; j < height; j+=5){
6  for(i = 0; i < width; i+=5){
7    for(k = 0; k < 5; k++){
8      for(l = 0; l < 5; l++){
if(isMaskA == true){
9       data[(i+k)+(j+l)*width] += maskA[k][l];
}
10 }
11 }
12 }
13 }
```

As shown in the above pseudocode, a scheme of dividing the whole image into blocks of 5 px×5 px and adding data of "maskA" to each block to form a pattern is employed. Moreover, while the above description is made with unicolored, gray, image data, with regard to a method of forming a pattern, there is also a case of wanting to form a pattern in a manner unlikely to be conspicuous in human vision.

Gray image data requires a pattern to be formed from luminance components and, therefore, the formed pattern is visually conspicuous. Although depending on the shape of a pattern to be formed or frequency components thereof, it is known that changing of color components is more unlikely to be visually conspicuous than changing of luminance components.

Therefore, for example, color image data which has RGB components is used and color space conversion into, for example, YCbCr, Lab, Yuv, or Lch is performed to divide the color image data into luminance components and color components. Then, mask data is applied to not luminance components but color components to form a pattern, so that an image which is unlikely to be visually conspicuous can be generated. Accordingly, in the first example embodiment, a method of using YUV for pixels in a printing area, which has attribute information about any one of a character attribute, line attribute, graphic attribute, and image attribute, and using yellow, which is ink high in brightness, for a non-printing area is described. Furthermore, while yellow, which is ink high in brightness, is favorable to be used, any color of the other colors (CMK) can be used instead. Thus, any component in a CMYK color space can be used. Moreover, instead of ink, toner can be used.

Moreover, while, in the first example embodiment, the whole image is divided into blocks of 5 px×5 px as a method of application to mask data, the first example embodiment is not limited to such a configuration. For example, instead, another unit of block size or another mask shape can be used. Any method can be used as long as it is a scheme capable of discriminating a pattern when image capturing is performed on a printed product C with multiplexing processing performed thereon.

The additional information multiplexing unit 310 embeds additional information in pixels having attribute information about any one of a character attribute, line attribute, graphic attribute, and image attribute included in image data, in such a way as to enable extracting additional information when performing image capturing on a printed product C with multiplexing processing performed thereon. Details of multiplexing processing which is performed by the additional information multiplexing unit 310 are described below.

The multiplexing parameters 315 are parameters which are to be used by the additional information multiplexing unit 310. FIG. 7 illustrates a table representing an example of multiplexing parameters. Referring to FIG. 7, a table in which an input is set as YUV (i.e., data in a YUV color space), 256 gradations for each color are set as 17 grid points, and U application values corresponding to those are described (17×17×17=4,913 grid points) is shown.

Each U application value corresponds to each numerical value in mask patterns illustrated in FIGS. 14A and 14B. Each value between adjacent grid points is calculated with use of interpolation processing. The interpolation processing can be performed with use of, for example, tetrahedral interpolation. Details of multiplex processing which is performed with use of the multiplexing parameters 315 are described below.

An additional information multiplexing unit 319 receives attribute data obtained by the drawing unit 302, the additional information 309, and multiplexing parameters 320, and performs processing for performing multiplexing on pixels which are not subjected to multiplexing processing by the additional information multiplexing unit 310 in image data. Although described in detail below, multiplexing processing which is performed by the additional information multiplexing unit 319 is performed by addition to yellow, which is ink highest in brightness and unlikely be visually recognized, according to mask data for use in the additional information multiplexing unit 310 and the multiplexing parameters 320. The multiplexing processing is processing for embedding, in image data, additional information 309 obtained by converting, for example, a text document into binary data of "0" and "1" in a format which is able to be extracted and read at a subsequent stage. For example, to make the additional information 309 into a format in which "0" and "1" are readable, the multiplexing processing performs mask processing on image data to cause an image area to have two periodicities.

The multiplexing parameters 320 are parameters which are to be used by the additional information multiplexing unit 319. Depending on the respective numeral values in mask patterns illustrated in FIGS. 14A and 14B, "2" in the mask patterns illustrated in FIGS. 14A and 14B is set as +25, "0" is set as 0, and "−1" is set as +12.

Figure 4:
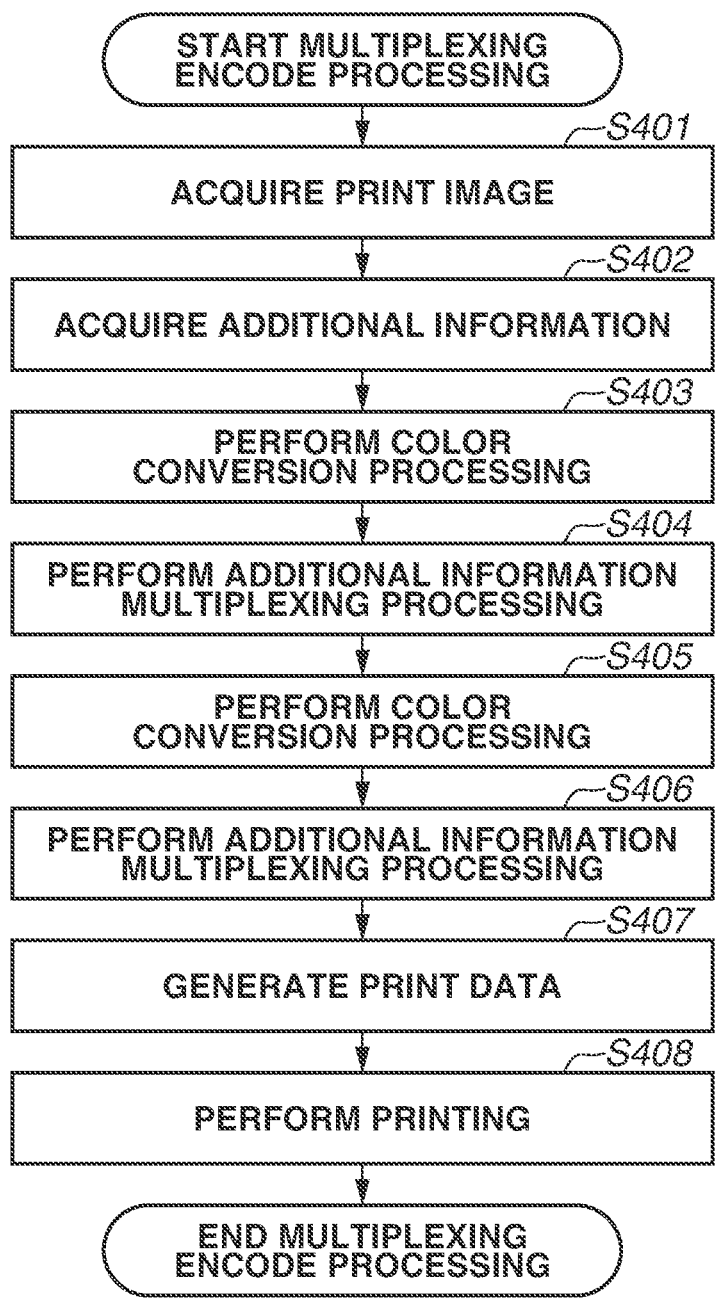
FIG. 4 is a flowchart illustrating multiplexing encode processing.

Multiplexing encode processing is described with reference to FIG. 4. FIG. 4 is a flowchart illustrating multiplexing encode processing according to the first example embodiment. Processing illustrated in FIG. 4 is implemented by, for example, the CPU 1902 reading out a program stored in the ROM 1903 onto the RAM 1904 and executing the program.

In step S401, the CPU 1902 generates image data and attribute data from the acquired PDL data A. Processing in step S401 corresponds to processing which is performed by the PDL data acquisition unit 301 and the drawing unit 302 illustrated in FIG. 3. Image data and attribute data obtained by the drawing unit 302 performing drawing are drawn with the number of pixels corresponding to an input resolution for the printer 103. In a case where the input resolution for the printer 103 is set as 600 dots per inch (dpi), for example, the number of pixels for paper size A4 is 5000×7000 pixels.

Next, in step S402, the CPU 1902 acquires additional information B as data to be embedded in a print image. Processing in step S402 corresponds to processing which is performed by the additional information 309 and the additional information multiplexing unit 310 illustrated in FIG. 3. For example, text document data obtained by optionally performing key input with a smartphone is acquired. Here, the text document data is assumed to be, for example, numerical data obtained by allocating numerals or characters to numerical values with use of character encoding "Shift JIS". The numerical data is transmitted as the additional information 309 illustrated in FIG. 3 to the additional information multiplexing unit 310.

Next, in step S403, the CPU 1902 performs color conversion on the drawn image data as appropriate, thus converting the input RGB values into DeviceRGB values. Processing in step S403 corresponds to processing which is performed by the color conversion unit 305 illustrated in FIG. 3.

Next, in step S404, the CPU 1902 performs processing for multiplexing additional information to pixels in a printing area having attribute information about any one of a character attribute, line attribute, graphic attribute, and image attribute in image data converted into DeviceRGB values. Processing in step S404 corresponds to processing which is performed by the additional information multiplexing unit 310 illustrated in FIG. 3. Details of the additional information multiplexing unit 310 are described below.

Next, in step S405, the CPU 1902 performs color conversion on the image data with the additional information multiplexed thereto as appropriate, thus converting the DeviceRGB values into ink color values. Processing in step S405 corresponds to processing which is performed by the ink color conversion unit 306 illustrated in FIG. 3.

Next, in step S406, the CPU 1902 performs processing for multiplexing additional information to pixels which have not been subjected to multiplexing in step S404. Processing in step S406 corresponds to processing which is performed by the additional information multiplexing unit 319 illustrated in FIG. 3. Details of the additional information multiplexing unit 319 are described below.

Next, in step S407, the CPU 1902 performs density correction on the image data with the additional information multiplexed thereto and further performs gradation conversion according to the gradation number, thus generating print data. Processing in step S407 corresponds to processing which is performed by the density correction unit 307 and the gradation conversion unit 308 illustrated in FIG. 3.

Then, in step S408, the CPU 1902 transmits the image subjected to gradation conversion to the print engine illustrated in FIG. 3. The print engine applies, to a recording medium, inks of the respective colors corresponding to the image subjected to gradation conversion, thus generating a printed product C, and, then, the CPU 1902 ends the processing illustrated in FIG. 4.

Figure 5:
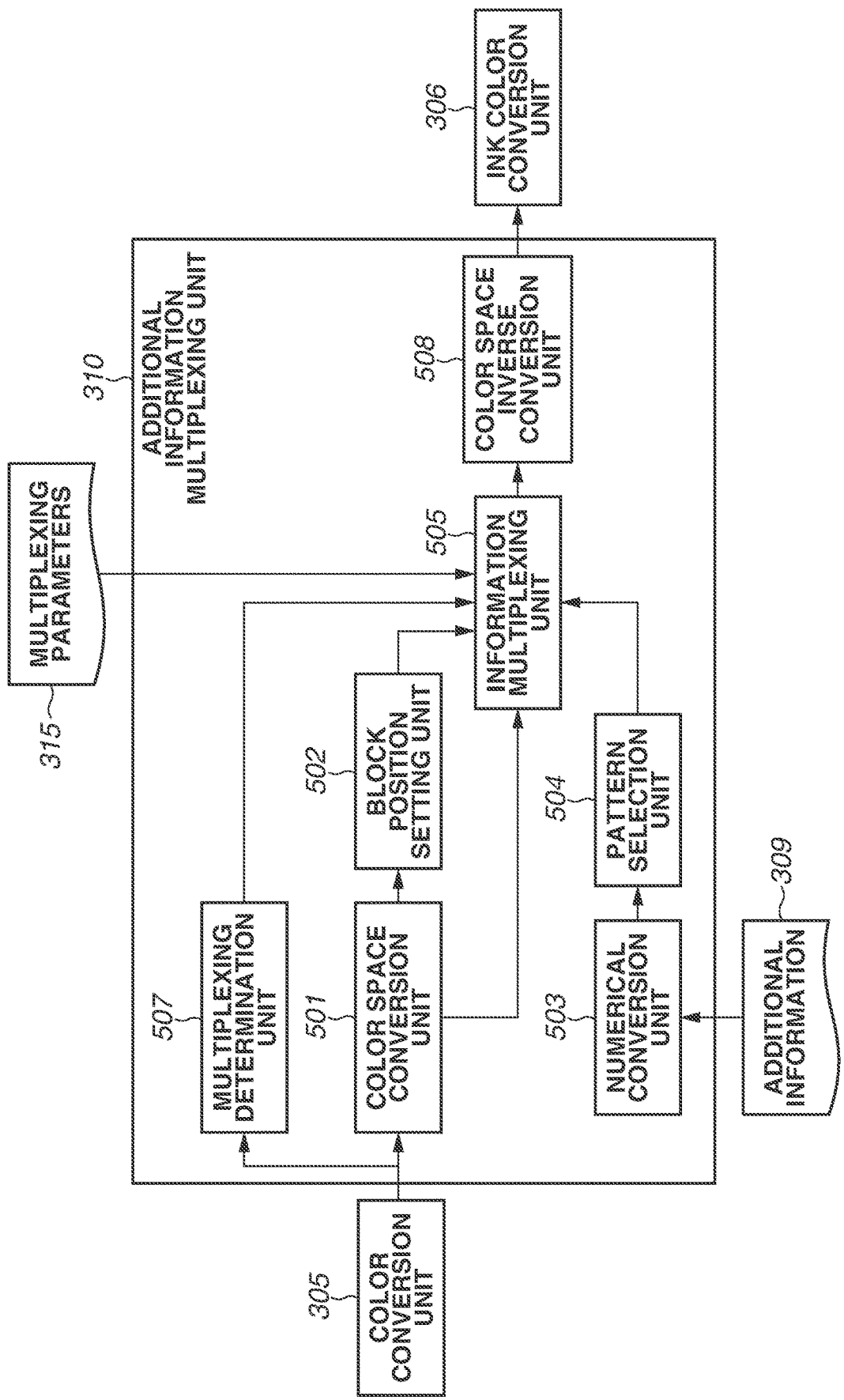
FIG. 5 is a diagram illustrating a block configuration of firmware for additional information multiplexing processing.

The additional information multiplexing unit 310 illustrated in FIG. 3 and processing in step S404 illustrated in FIG. 4 are described with reference to FIG. 5. FIG. 5 is a diagram illustrating a block configuration of firmware for additional information multiplexing processing in the first example embodiment. Various processing units illustrated in FIG. 5 are described.

A color space conversion unit 501 is a processing unit which performs conversion into a color space on which to perform information multiplexing, with respect to image data subjected to color conversion by the color conversion unit 305. For example, in a case where a color space on which to perform information multiplexing is set to U of YUV and the color space of an input image is RGB, the color space conversion unit 501 converts a color space of RGB into a color space of YUV using the following formulae (1), (2), and (3):

$$Y = 0.299 \times R + 0.587 \times G + 0.114 \times B \quad (1)$$

$$U = -0.169 \times R - 0.331 \times G + 0.500 \times B \quad (2)$$

$$V = 0.500 \times R - 0.419 \times G - 0.081 \times B \quad (3)$$

While, in the first example embodiment, the description is performed with use of a U plane, the same also applies to a Y or V plane. In the first example embodiment, additional information is embedded by dividing image data to be printed into a plurality of block areas and forming a pattern by density modulation of each pixel on a block-by-block basis.

A block position setting unit 502 is a processing unit which acquires image data subjected to color space conversion and sets position coordinates of blocks in conformity with the size of one block designated with respect to an image of the designated color plane. For example, the image size of a U color plane of YUV is assumed to be 640 px in vertical width×480 px in horizontal width and the block size thereof is assumed to be 5 px in vertical width×5 px in horizontal width. In that case, the number of blocks in vertical direction is 640/5=128, i.e., 128 blocks, and the number of blocks in horizontal direction is 480/5=96, i.e., 96 blocks. Moreover, the total number of blocks is 128× 96=12288, i.e., 12,288 blocks. For example, the upper left coordinates of each block is defined and set as a block position.

A numerical conversion unit 503 is a processing unit which receives the additional information 309 and converts the received additional information 309 into numerically converted data. For example, the additional information 309 is assumed to be a character string in Shift JIS. The numerical conversion unit 503 previously stores a conversion map in which characters and numerical values are associated with each other in the format of Shift JIS, and performs data conversion of a character string into a numerical string. In the case of a character sting "hello", the numerical string obtained by conversion becomes "0110100001100101011011000110110001101111".

A pattern selection unit 504 is a processing unit which previously registers mask patterns for use in density modulation of each pixel on a block-by-block basis and selects a mask pattern to be applied to data obtained by the numerical conversion unit 503 performing numerical conversion of the additional information 309.

FIGS. 14A and 14B are image diagrams illustrating patterns obtained by numerical conversion of mask patterns different in frequency characteristics. For example, a set of 5 px in vertical width×5 px in horizontal width is assumed to be one block, and patterns illustrated in FIGS. 14A and 14B are used as mask patterns of one block. Moreover, in a case where a numerical value for use in multiplexing is "0", the pattern illustrated in FIG. 14A is used, and, in a case where a numerical value for use in multiplexing is "1", the pattern illustrated in FIG. 14B is used. Thus, one bit of "0" or "1" is able to be expressed for each block.

A multiplexing determination unit 507 acquires attribute data obtained by the drawing unit 302 performing drawing, determines whether to cause an information multiplexing unit 505 described below to apply a mask pattern to image data for each pixel, and sets pixels on which to perform multiplexing processing. In the first example embodiment, the multiplexing determination unit 507 performs settings to perform multiplexing processing on pixels having attribute information about any one of a character attribute, line attribute, graphic attribute, and image attribute.

The information multiplexing unit 505 acquires image data obtained by the color space conversion unit 501 performing color space conversion, acquires pixels on which to perform multiplexing processing set by the multiplexing determination unit 507, and acquires positions of respective blocks set by the block position setting unit 502. Additionally, the information multiplexing unit 505 acquires a mask pattern for each numerical value selected by the pattern selection unit 504. Additionally, the information multiplexing unit 505 acquires the multiplexing parameters 315. The information multiplexing unit 505 is a processing unit which generates an image obtained by applying a mask pattern to image data from the acquired pieces of information.

Since, when image capturing of a printed product is performed, image capturing of the whole printed product is not always able to be performed, the same data is embedded in a plurality of portions in advance in such a way as to enable extracting additional information even when image capturing of a part of the printed product is performed. For example, assuming that the number of clocks of the whole image is 12,288 blocks and the unit of one piece of additional information is 96 blocks, since 12288/96=128, the same data is embedded in 128 divided areas. Thus, the image data is divided into 128 areas. One area includes 96 blocks, each block being composed of 5 px in vertical width×5 px in horizontal width. Since 96 blocks are treated as one piece of additional information, pieces of additional information corresponding to 96 bits are able to be set. However, to make the starting position of 96 bits identifiable, 8 bits of "11111111", which do not represent any character in the case of Shift JIS, are caused to be included in the head of characters. Accordingly, data of 96−8=88 bits is able to be defined as additional information.

A numerical string of "0" and "1" set by the numerical conversion unit 503 is defined as data to be fitted into 88 bits. A numerical value is defined for each block, and a mask pattern is selected according to the numerical value. Additionally, a numerical value for each pixel is determined according to a numerical value included in the mask pattern.

For example, suppose that all of the YUV values of one block (5 px×5 px) included in an image obtained by the color space conversion unit 501 performing color space conversion are Y:0, U:−112, and V:0. In that case, if the U value is converted according to the multiplexing parameters 315 illustrated in FIG. 7, the converted U value becomes −112 in a case where the mask pattern is "0", becomes −102 in a case where the mask pattern is "2", and becomes −122 in a case where the mask pattern is "−1". Thus, in a block of 5 px×5 px with the same U value "−112" embedded therein, the U value is changed to any one of −112, −102, and −122 according to the mask pattern, thus exhibiting a predetermined periodicity.

Furthermore, the method of applying a mask pattern only needs to be a method of changing a value available for changing a frequency on a block-by-block basis on a U plane, and is not limited to such a configuration. For example, a method of using not a table such as the multiplexing parameters 315 but a value obtained by multiplying the U value of YUV by a numerical value of the mask pattern can be employed.

A color space inverse conversion unit 508 is a processing unit which returns the color space obtained by the color space conversion unit 501 performing conversion to the original color space. For example, in the case of returning a color space of YUV to a color space of RGB, the color space inverse conversion unit 508 converts the color space of YUV to the color space of RGB using the following formulae (4), (5), and (6).

$$R = 1.000 \times Y + 1.402 \times V \tag{4}$$

$$G = 1.000 \times Y - 0.344 \times U - 0.714 \times V \tag{5}$$

$$B = 1.000 \times Y + 1.772 \times U \tag{6}$$

Thus far is the description of multiplexing encode processing which is performed by the additional information multiplexing unit 310.

Figure 21:
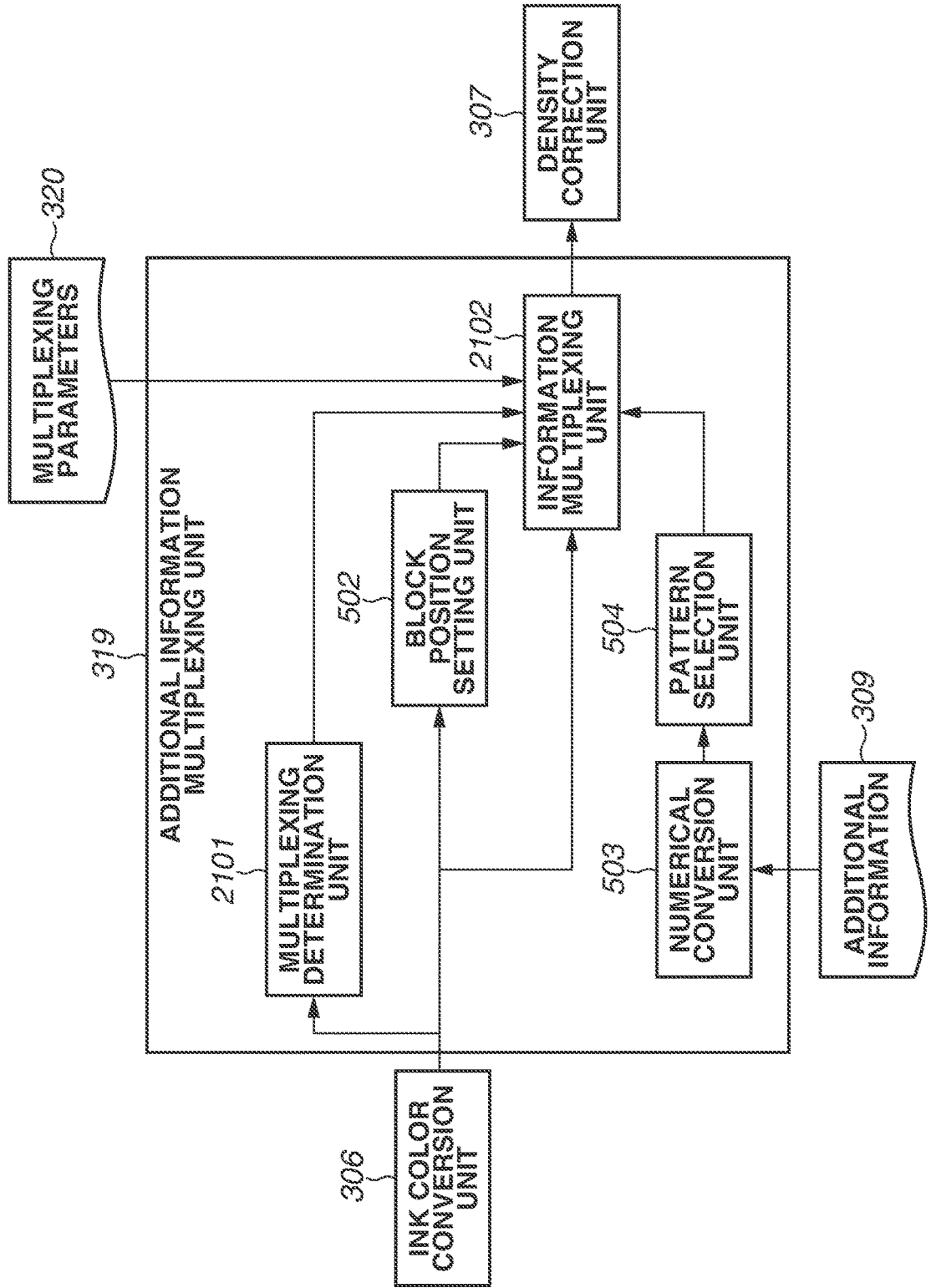
FIG. 21 is a diagram illustrating a block configuration of firmware for additional information multiplexing processing.

Next, the additional information multiplexing unit 319 illustrated in FIG. 3 and processing in step S406 illustrated in FIG. 4 are described with reference to FIG. 21. FIG. 21 is a diagram illustrating a block configuration of firmware for additional information multiplexing processing according to the first example embodiment. Various processing units illustrated in FIG. 21 are described. Furthermore, in the first example embodiment, additional information multiplexing processing operations which are respectively performed by the additional information multiplexing unit 310 and the additional information multiplexing unit 319 differ only in a multiplexing determination unit and an information multiplexing unit, and, therefore, the same portions as those described with reference to FIG. 5 are omitted from description here.

A multiplexing determination unit 2101 acquires attribute data obtained by the drawing unit 302 performing drawing, determines whether to cause an information multiplexing unit 2102 to apply a mask pattern to image data for each pixel, and sets pixels on which to perform multiplexing processing. In the first example embodiment, the multiplexing determination unit 2101 performs settings to perform multiplexing processing on pixels having attribute information about any one of a character attribute, line attribute, graphic attribute, and image attribute.

The information multiplexing unit 2102 acquires image data obtained by the ink color conversion unit 306 performing color conversion, acquires pixels on which to perform multiplexing processing set by the multiplexing determination unit 2101, and acquires positions of respective blocks set by the block position setting unit 502. Additionally, the information multiplexing unit 2102 acquires a mask pattern for each numerical value selected by the pattern selection unit 504. Additionally, the information multiplexing unit 2102 acquires the multiplexing parameters 320. The information multiplexing unit 2102 is a processing unit which generates an image obtained by applying a mask pattern to image data from the acquired pieces of information.

As mentioned above, the information multiplexing unit 2102 performs information multiplexing on image data obtained by the ink color conversion unit 306 performing color conversion, according to the selected mask pattern, pixels on which to perform multiplexing processing set by the multiplexing determination unit 2101, and the multiplexing parameters 320 on a block-by-block basis. As mentioned above, the multiplexing parameters 320 correspond to the numerical values included in the mask patterns illustrated in FIGS. 14A and 14B. In the mask pattern, a numerical value "2" corresponds to +25, a numerical value "0" corresponds to 0, and a numerical value "−1" corresponds to +12. The information multiplexing unit 2102 performs multiplexing by adding numerical values corresponding to such numerical values in the mask pattern to values of yellow (Y) of ink colors. Furthermore, while, in the first example embodiment, multiplexing which is performed by the information multiplexing unit 2102 is performed with respect to yellow (Y) of ink colors as mentioned above, the present example embodiment is not limited to this, but, naturally, the multiplexing processing can also be performed with respect to another ink color such as cyan (C).

The above-described multiplexing encode processing represents a content of processing which is performed by the additional information multiplexing apparatus 102 illustrated in FIG. 1A and, moreover, represents a content of processing which is performed by the additional information multiplexing unit 105 illustrated in FIG. 1B.

As also illustrated in FIGS. 1A and 1B, a processing unit which performs multiplexing encode processing can be configured not to be included in the printer 103 or can be configured to be included in the printer 103. As long as a multiplexed image generated by the additional information multiplexing apparatus 102 or the additional information multiplexing unit 105 performing multiplexing encode processing is able to be transmitted to the printer 103 or the printing unit 106, any one of the configurations illustrated in FIGS. 1A and 1B can be employed.

Moreover, while, in the first example embodiment, pixels on which to perform multiplexing processing are determined according to attribute data obtained by the drawing unit 302 performing drawing as mentioned above, as long as it is possible to discriminate a printing area and a non-printing area, the present example embodiment is not limited to such a determination method. For example, since image data has an RGB color space, pixels on which to perform multiplexing processing can be determined by determining, as a printing area, pixels of dark colors the sum of values of the respective color planes of which is less than or equal to a predetermined value and determining, as a non-printing area, pixels of bright colors the sum of values of the respective color planes of which is greater than the predetermined value.

<Description of Multiplexing Decode Processing>

Figure 8:
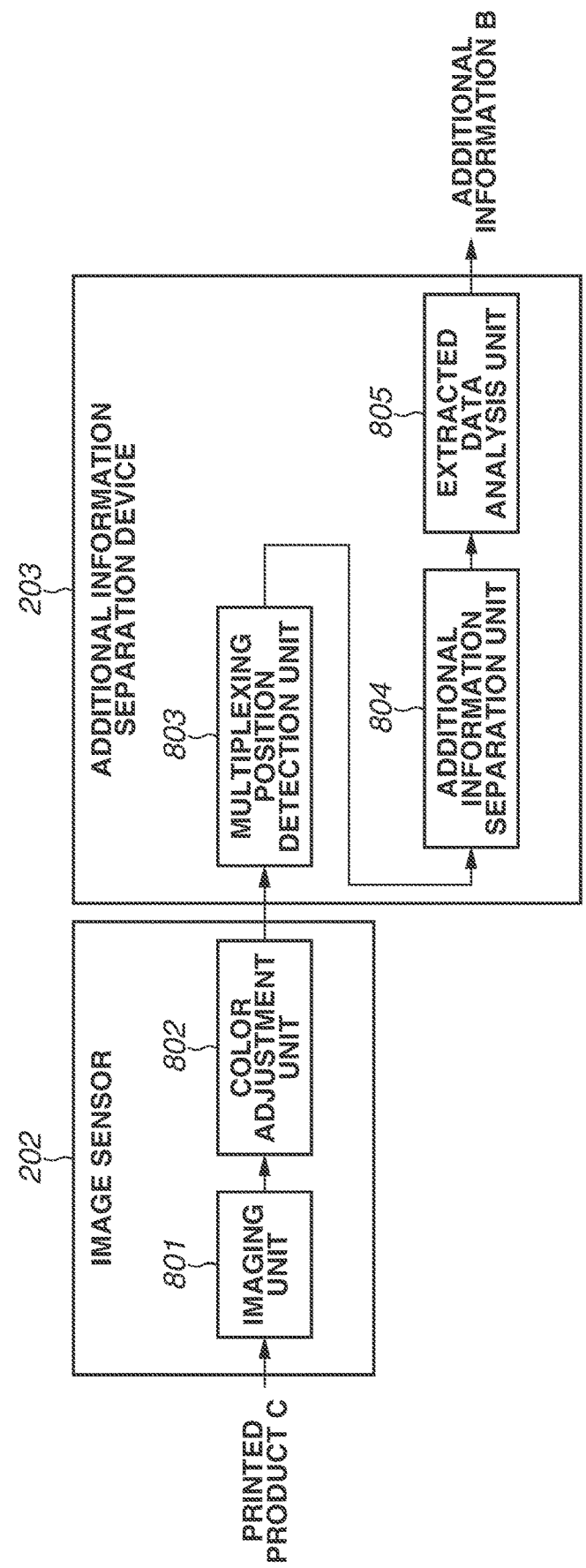
FIG. 8 is a diagram illustrating a block configuration of firmware for multiplexing decode processing.

FIG. 8 is a diagram illustrating a block configuration of basic firmware for multiplexing decode processing according to the first example embodiment. Processing described below is performed so that additional information embedded in a printed product is extracted. Various processing units illustrated in FIG. 8 are described.

The image sensor 202 includes an imaging unit 801 and a color adjustment unit 802. The additional information separation device 203 includes a multiplexing position detection unit 803, an additional information separation unit 804, and an extracted data analysis unit 805.

In the first example embodiment, data about additional information obtained by performing numerical conversion of, for example, text document data, audio data, or moving image data is assumed to be added as a pattern shape to a printed product C. For example, in the following description, with regard to the additional information, the same information is assumed to be repetitively added to each area of the whole printed product C. The imaging unit 801 converts a printed product C with multiplexing encode processing performed thereon into captured image data with imaging elements included in the image sensor 202 illustrated in FIG. 2.

Figure 9:
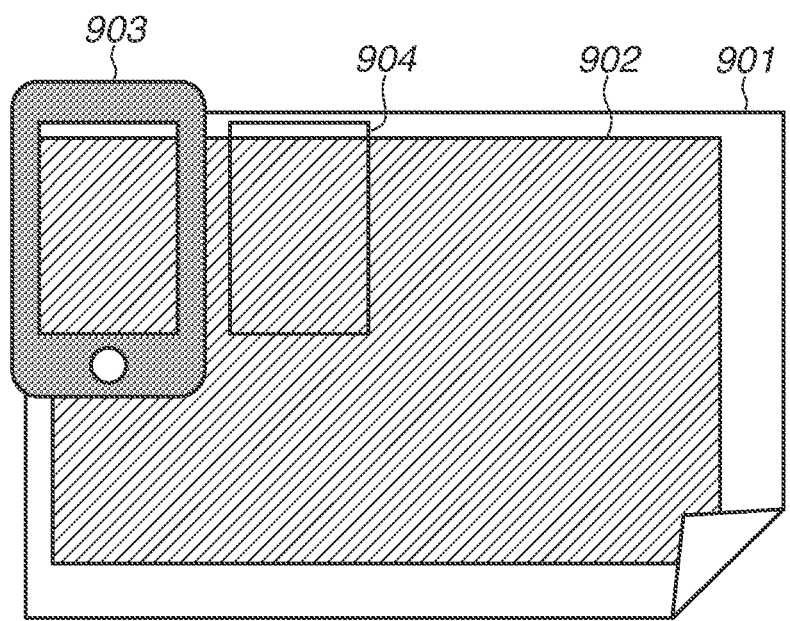
FIG. 9 is a diagram illustrating a concept of performing image capturing of a printed product with multiplexing encode processing performed thereon.

FIG. 9 is an image diagram illustrating a method of performing image capturing of a printed product with multiplexing encode processing performed thereon with a camera-equipped mobile terminal. In FIG. 9, a printed product 901 represents a printed product with multiplexing encode processing performed on a recording medium, which is equivalent to the printed product C. An area 902 represents an area with multiplexing encode processing performed therein included in a printing area of the printed product 901. A terminal 903 represents an apparatus having a function equivalent to the camera-equipped mobile terminal 201. An area 904 represents an area the image of which is captured by the camera-equipped mobile terminal 903.

For example, the imaging unit 801 performs image capturing of the image capturing area 904 in the area 902 with multiplexing encode processing performed therein included in the printed product 901 with multiplexing encode processing performed thereon, with use of the camera-equipped mobile terminal 903, as illustrated in FIG. 9.

For example, imaging elements included in the image sensor 202 are assumed to be a charge-coupled device (CCD). The imaging element CCD is a known technique, and, therefore, the detailed description thereof is omitted. As outlined below, in the CCD, light receiving elements called photodiodes are capable of sensing light and converting the light into a voltage. In that instance, since light passes through a color filter such as an RGB or CMY filter arranged for each element, the CCD is capable of converting light into color data. Sensor values obtained by image capturing are transmitted to the color adjustment unit 802.

The color adjustment unit 802 converts sensor values extracted by the photodiodes included in the imaging unit 801 into image data as 8-bit data per pixel in YUV. Moreover, the color adjustment unit 802 additionally performs color adjustment processing which is performed during normal image capturing, such as while balance and brightness adjustment.

The multiplexing position detection unit 803 acquires image data obtained by performing image capturing of a printed product with multiplexing processing performed thereon and then performing color adjustment. The multiplexing position detection unit 803 acquires frequency characteristics with respect to the acquired image data. The multiplexing position detection unit 803 determines positions with multiplexing processing performed therein by determining the acquired frequency characteristics.

Figure 12:
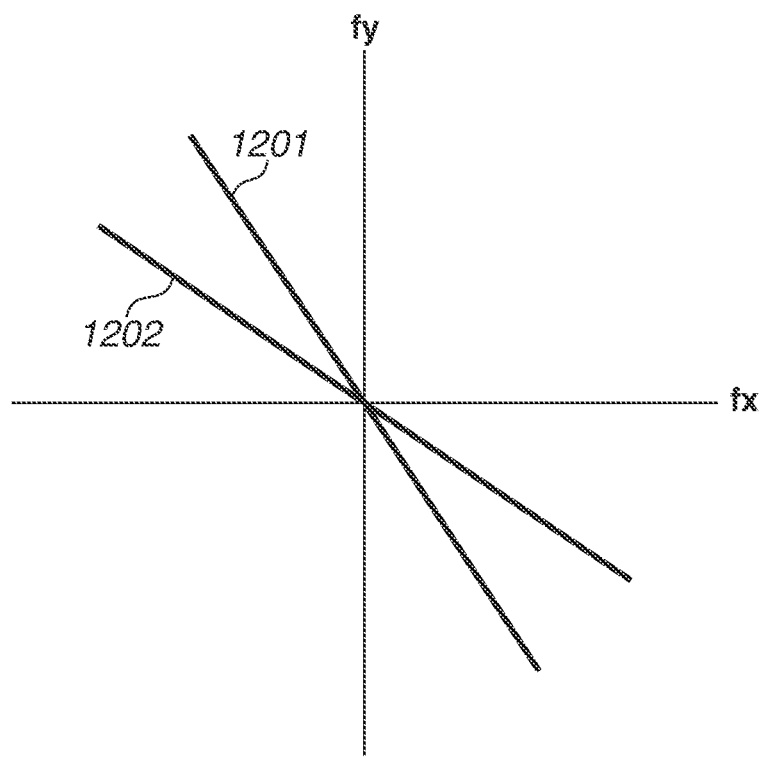
FIG. 12 is a diagram illustrating a difference in frequency characteristics between two-dimensional frequency domains.

FIG. 12 is an outline diagram illustrating a difference in frequency characteristics in a two-dimensional frequency domain. The horizontal axis indicates a frequency in the horizontal direction, and the vertical axis indicates a frequency in the vertical direction. The origin serving as a center indicates a direct-current component, and, as more distant from the origin, the frequency increases to a high-frequency area. In the first example embodiment, depending on switching of the mask patterns illustrated in FIGS. 14A and 14B, frequency characteristics of U components in YUV of the printed product with multiplexing processing performed thereon are changed.

For example, in response to changing of characteristics of U components by the mask pattern illustrated in FIG. 14A, a large power spectrum is assumed to occur on the frequency vector of a straight line 1201 illustrated in FIG. 12. Moreover, in response to changing of characteristics of U components by the mask pattern illustrated in FIG. 14B, a large power spectrum is assumed to occur on the frequency vector of a straight line 1202 illustrated in FIG. 12. At the time of additional information separation, the multiplexing position detection unit 803 is able to detect a multiplexing signal by detecting a frequency vector on which a large power spectrum occurs.

The mask patterns illustrated in FIGS. 14A and 14B are equivalent to high-pass filters (HPFs) each having the directionality of a specific frequency vector. The mask patterns illustrated in FIGS. 14A and 14B are also used as spatial filters used to detect a frequency vector. Thus, the spatial filter illustrated in FIG. 14A enables enhancing a frequency vector on the straight line 1201, and, moreover, the spatial filter illustrated in FIG. 14B enables enhancing a frequency vector on the straight line 1202.

For example, suppose now that, in response to the mask pattern illustrated in FIG. 14A, a large power spectrum has occurred on the frequency vector of the straight line 1201 illustrated in FIG. 12. In that case, the amount of change of a power spectrum is amplified in the spatial filter illustrated in FIG. 14A, but is almost never amplified in the spatial filter illustrated in FIG. 14B. Thus, if a plurality of spatial filters is used for filtering in parallel, the amplification occurs only when spatial filters equal in frequency vector are used, and the amplification almost never occurs when the other spatial filters are used. Accordingly, it is possible to readily determine on what frequency vector a large power spectrum is occurring.

Moreover, while, here, a frequency vector is detected with U components at the time of separation of additional information from a printed product with multiplexing processing performed thereon by changing frequency characteristics in U components in YUV, if U components are lost, the additional information becomes unable to be separated. While, in a case where the characteristics are switched from U components to other components, i.e., Y components or V components, the additional information is able to be separated if the frequency characteristics are determined with Y components or V components, a longer time becomes required than when only U components are analyzed.

As mentioned above, performing determination of frequency characteristics enables extracting data.

However, if, in determining frequency characteristics, a position at which to extract data is not correct, it becomes hard to correctly extract data.

Figure 16A:
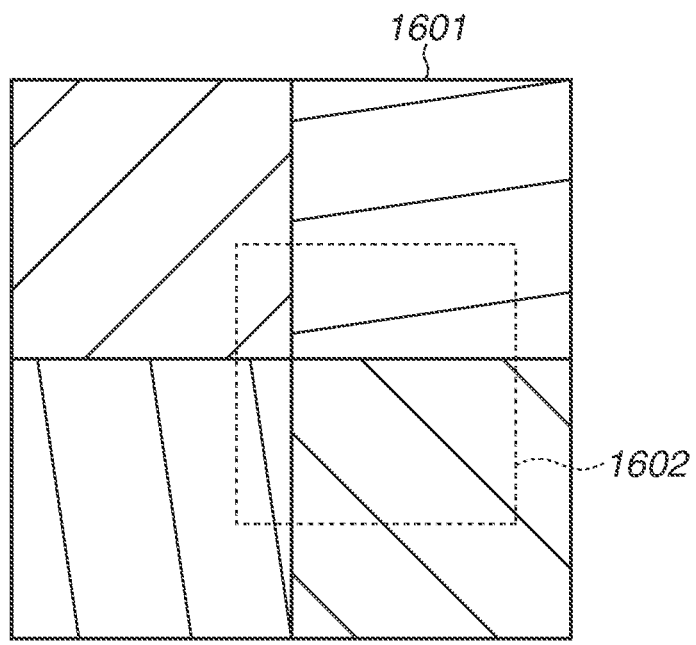
FIGS. 16A and 16B are diagrams used to explain a detected position of a block.
Figure 16B:
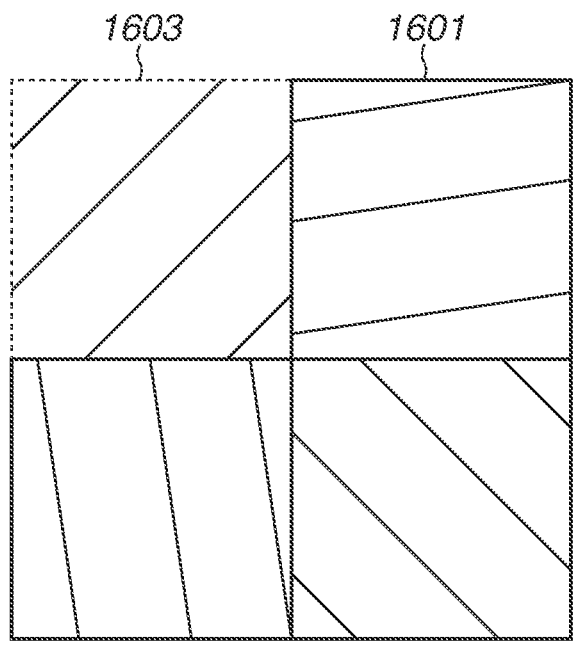

FIGS. 16A and 16B are diagrams used to explain a detecting position in determining frequency characteristics. An image 1601 represents an image including four blocks with multiplexing processing performed therein in a printed product. Areas 1602 and 1603 represent areas in which to determine frequency characteristics on a block-by-block basis. In FIGS. 16A and 16B, it is illustrated that the area 1602 deviates from the position of each block with multiplexing processing performed therein. It is illustrated that the area 1603 matches the position of a block with multiplexing processing performed therein. In this case, while the area 1603 is able to be used to correctly identify a previously determined frequency, the area 1602 lowers a power spectrum on a specific frequency vector and, therefore, makes it difficult to identify a previously determined frequency.

The multiplexing position detection unit 803 detects a block position based on whether a power spectrum on a specific frequency vector is strong or weak. Therefore, the multiplexing position detection unit 803 performs determination of frequency characteristics while shifting block positions with respect to the acquired captured image data, thus detecting the position of a block with multiplexing processing performed therein.

The additional information separation unit 804 extracts multiplexed additional information with use of a result of determination of frequency characteristics based on the position detected by the multiplexing position detection unit 803.

Figure 15:
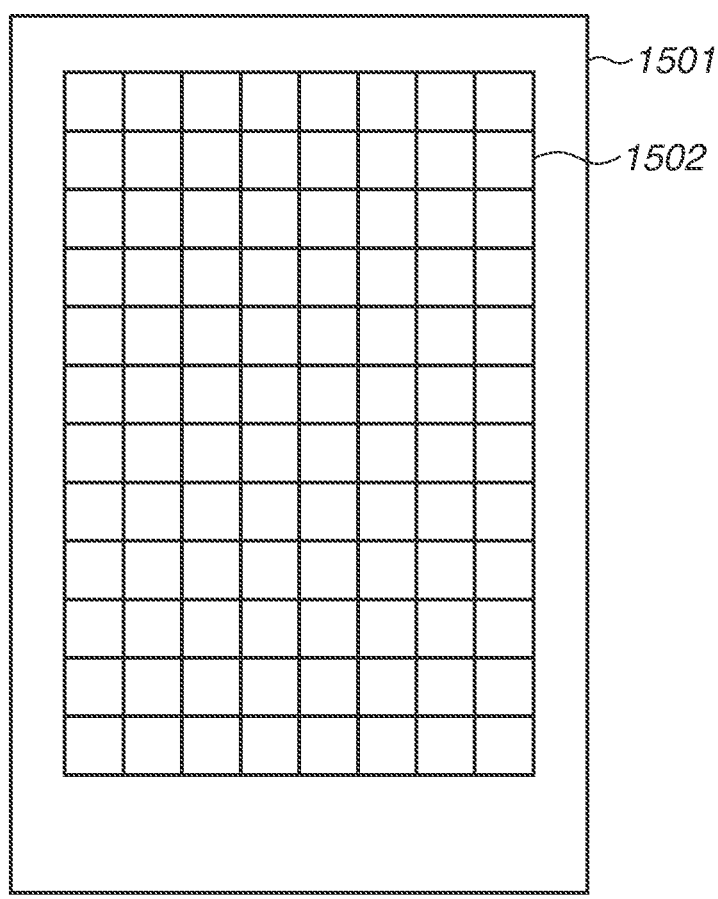
FIG. 15 is a diagram illustrating a condition in which multiplexing has been performed for each block on a print sheet.

FIG. 15 is a diagram illustrating a condition in which multiplexing has been performed for each block on a print sheet. In FIG. 15, a print sheet 1501 represents a print sheet, and a block 1502 represents a block in which multiplexing has been performed. The number of blocks in each of which multiplexing has been performed is assumed to be 8 blocks in horizontal direction and 12 blocks in vertical direction, i.e., 96 blocks in total. In FIG. 15, "0" and "1" of additional information are assumed to have been embedded in respective blocks by multiplexing encode processing.

For example, if the power spectrum of a frequency vector on the straight line 1201 illustrated in FIG. 12 exceeds a given threshold value, data is determined to be "0". Moreover, if the power spectrum of a frequency vector on the straight line 1202 exceeds a given threshold value, data is determined to be "1". The additional information separation unit 804 performs determination of frequency characteristics while shifting positions for 96 blocks on a block-by-block basis based on the positions detected by the multiplexing position detection unit 803. In this case, the additional information separation unit 804 is able to determine one bit of "0" or "1" for each block and is, therefore, able to extract data for 96 bits in total. In this way, the additional information separation unit 804 performs determination of frequency characteristics while shifting positions, thus being able to extract multiplexed data.

The extracted data analysis unit 805 performs processing for analyzing data with respect to a numerical string separated as additional information by the additional information separation unit 804 and then converting the data into the format of original embedded additional information. For example, in advance, additional information to be multiplexed is assumed to be text document data and is assumed to be a value obtained by numerical conversion with character encoding "Shift JIS".

In one-byte code (one-byte character) of Shift JIS, a combination of higher-order 4 bits and lower-order 4 bits is able to be used to perform conversion associated with a numerical value and a character. For example, in a case where higher-order 4 bits are "0100" and lower-order 4 bits are "0001", "A" is determined as a character string. In this way, previously storing a conversion map to associate data with numerical strings enables performing conversion into a character.

The extracted data analysis unit 805 temporarily stores a numerical string separated as additional information in the RAM 206 illustrated in FIG. 2, and makes ready to refer to a "Shift JIS" conversion map previously stored in the secondary storage device 207.

For example, a numerical string of the additional information separated by the additional information separation unit 804 is assumed to be "0110100001100101011011000110110001101111". In this case, the result of associating the numerical value with the conversion map is as follows. Upper-order 4 bits "0110" and lower-order 4 bits "1000" signify a character "h". Upper-order 4 bits "0110" and lower-order 4 bits "0101" signify a character "e". Upper-order 4 bits "0110" and lower-order 4 bits "1100" signify a character "1". Upper-order 4 bits "0110" and lower-order 4 bits "1100" signify a character "1". Upper-order 4 bits "0110" and lower-order 4 bits "1111" signify a character "o". Accordingly, "hello" is extracted as a character string.

Upon extracting additional information, for example, the CPU 204 displays the extracted character string on the display 208 illustrated in FIG. 2. Moreover, in a case where the extracted character string is a Uniform Resource Locator (URL), the CPU 204 connects to the network via the network interface 210 and displays a screen obtained at the URL destination on the display 208 with use of a browser. Moreover, in a case where the URL is a video site, the CPU 204 displays a moving image on the display 208 and outputs sound via the loudspeaker 211.

Figure 10:
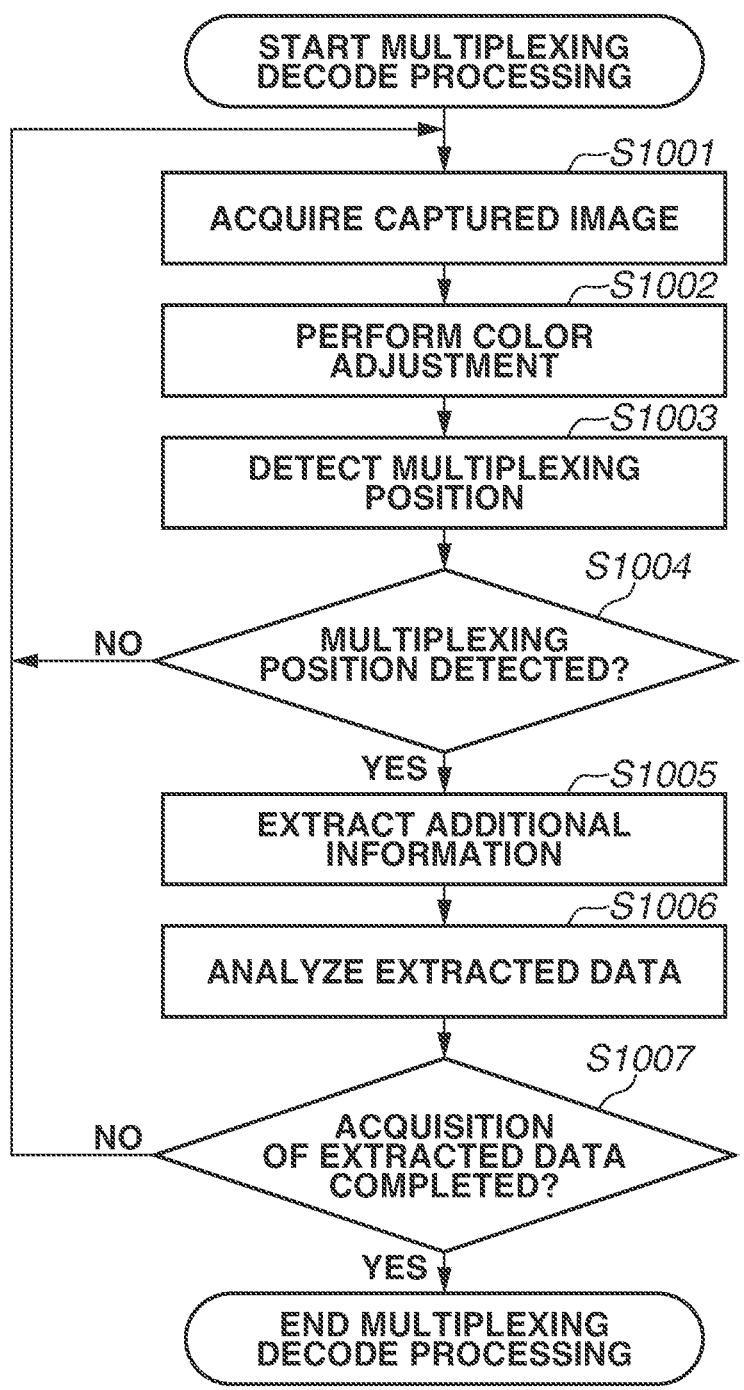
FIG. 10 is a flowchart illustrating multiplexing decode processing.

FIG. 10 is a flowchart illustrating multiplexing decode processing according to the first example embodiment. Processing illustrated in FIG. 10 is implemented by, for example, the CPU 204 reading out a program stored in the ROM 205 onto the RAM 206 and executing the program.

In step S1001, the CPU 204 causes the image sensor 202 to perform image capturing of a printed product C with multiplexing processing performed thereon. The image sensor 202 transmits sensor values obtained by converting captured light into color data values to the color adjustment unit 802. Processing in step S1001 corresponds to processing which is performed by the imaging elements of the imaging unit 801 illustrated in FIG. 8 acquiring a captured image.

In step S1002, the CPU 204 performs color adjustment of the acquired captured image. The color adjustment unit 802 receives color data values from the imaging unit 801, performs white balance adjustment, and generates color data with white balance adjusted as image data. The color adjustment unit 802 transmits the generated image data to the additional information separation device 203. Alternatively, the color adjustment unit 802 stores the generated image data in the secondary storage device 207 illustrated in FIG. 2. Processing in step S1002 corresponds to processing which is performed by the color adjustment unit 802 illustrated in FIG. 8 generating an image with color adjustment for white balance performed thereon.

In step S1003, the CPU 204 receives image data with white balance performed thereon from the color adjustment unit 802 or receives image data stored in the secondary storage device 207 illustrated in FIG. 2.

The multiplexing position detection unit 803 performs determination of frequency characteristics with respect to the acquired image data, thus detecting a position with multiplexing processing performed therein (a multiplexing position). Processing in step S1003 corresponds to processing for detecting a reference position with multiplexing processing performed therein from image data, which is performed by the multiplexing position detection unit 803 illustrated in FIG. 8.

In step S1004, the CPU 204 determines whether a reference position with multiplexing processing performed therein has been detected from image data by the multiplexing position detection unit 803. If it is determined that the reference position has been detected (YES in step S1004), the CPU 204 advances the processing to step S1005, and, if it is determined that the reference position has not been detected (NO in step S1004), the CPU 204 returns the processing to step S1001.

In step S1005, the CPU 204 extracts the multiplexed additional information as numerical data with use of a result of determination of frequency characteristics based on the image data generated by the color adjustment unit 802 and the reference position with multiplexing processing performed therein detected by the multiplexing position detection unit 803. Processing in step S1005 corresponds to processing for extracting additional information from image data, which is performed by the additional information separation unit 804 illustrated in FIG. 8. The additional information separation unit 804 transmits the extracted numerical data to the extracted data analysis unit 805 illustrated in FIG. 8. Alternatively, the additional information separation unit 804 temporarily stores the extracted numerical data in the RAM 206 illustrated in FIG. 2 and communicates that effect to the extracted data analysis unit 805.

In step S1006, the CPU 204 causes the extracted data analysis unit 805 illustrated in FIG. 8 to acquire numerical data equivalent to the separated additional information, analyze the numerical data, and convert the numerical data into additional information representing, for example, character data. Processing in step S1006 corresponds to processing for extracting additional information, which is performed by the extracted data analysis unit 805 illustrated in FIG. 8.

In step S1007, the CPU 204 determines whether acquisition of the extracted additional information by the extracted data analysis unit 805 illustrated in FIG. 8 has been completed. If it is determined that acquisition of the extracted additional information has been completed (YES in step S1007), the CPU 204 ends the multiplexing decode processing illustrated in FIG. 10, and, if it is determined that acquisition of the extracted additional information has not yet been completed (NO in step S1007), the CPU 204 returns the processing to step S1001.

In a case where additional information has been able to be acquired from a printed product with multiplexing processing performed thereon, the CPU 204 displays a result thereof on, for example, the display 208 illustrated in FIG. 2 or accesses a network. In a case where additional information has not been able to be acquired from a printed product with multiplexing processing performed thereon, a case can be seen where, for example, the captured image data does not include the entirety of an area from which additional information is able to be extracted. In that case, since only a part of the additional information has been able to be extracted, the acquired data is not complete, so that it is necessary to re-perform image capturing.

To enable determining whether additional information has been able to be extracted, for example, additional information itself can be configured to include a value indicating the data amount of additional information. Then, the data amount of additional information can be configured to be determined by extracting the data amount. In the case of determining whether additional information is the data amount or character data, for example, if a combination of numerical strings is previously determined and several bits immediately behind the numerical strings are determined to be the data amount, it becomes possible to extract the data amount.

In a case where only a part of the additional information has been able to be extracted, for example, a portion of content which has been able to be extracted can be preliminarily stored in the secondary storage device 207 illustrated in FIG. 2 and, when an additional portion has been able to be extracted, the respective extracted portions can be combined into additional information. Thus, additional information can be configured to be extracted in a plurality of batches. Moreover, while, in step S1007, determination of the completion of extracted data acquisition is performed, displaying can be performed on, for example, the display 208 illustrated in FIG. 2 in such a way as to start with additional information which has been able to be extracted.

In the above description, a configuration of the first example embodiment has been described. In the following description, an example of the first example embodiment is described. In the first example embodiment, multiplexing processing on a printing area by the additional information multiplexing unit 310 is performed behind the color conversion unit 305 illustrated in FIG. 3. This is because, as mentioned above, the color conversion unit 305 performs color conversion into a device color space with ink for a printer or color reproducibility for a recording medium taken into account (for example, DeviceRGB). FIG. 13 is a diagram illustrating an example of color conversion. For simplicity's sake, a two-dimensional plane of a* and b* axes of the Lab color space is described. A color space 1301 represents a state in which the sRGB color space, which is obtained before color conversion, has been converted into the Lab color space. Moreover, a color space 1302 represents a state in which the DeviceRGB color space for predetermined ink for a printer and a recording medium has been converted into the Lab color space. Thus, colors of points A, B, and C obtained before color conversion are converted by the color conversion unit 305 into colors of points A', B', and C' after color conversion.

Here, in a case where values "−1", "0", and "2" of mask patterns embedded with U components (in YUV) obtained after color conversion are assumed to be colors of points A, B, and C in a* components (in Lab) obtained before color conversion, respective distances between points A', B', and C' become disadvantageously shorter due to color conversion. This means that, if multiplexing processing is performed before color conversion, determination of frequency characteristics is failed at the time of separating additional information in a printing area, so that additional information may become unable to be separated. In the first example embodiment, at the time of embedding additional information in an image, since, in a printing area, multiplexing processing is performed in such a manner that color modulation is implemented in an output color space, as a result, it is possible to prevent additional information from becoming unable to be extracted from a printed product as mentioned above.

As described above, according to the first example embodiment, a method of, with respect to a printing area, performing information multiplexing unlikely to be visually recognized and enabling separation of additional information with use of YUV and, with respect to a non-printing area, performing information multiplexing with the same mask patterns as those for a printing area with use of yellow, which is ink high in brightness has been described. This enables satisfying both of unlikeliness of visual discrimination of a multiplexing pattern and separation of additional information from a printed product while multiplexing the same additional information even to a document large in non-printing area.

In the following description, a second example embodiment is described with regard to differences from the first example embodiment. FIG. 17 is a diagram illustrating a block configuration of basic firmware for multiplexing encode processing according to the second example embodiment. Blocks assigned the respective same reference numerals as those in the block diagram of FIG. 3 are the respective same blocks described with reference to FIG. 3 and are, therefore, omitted from description here.

In the second example embodiment, multiplexing processing on a printing area is performed at a stage prior to the color conversion unit 305. As mentioned above, if color conversion is performed after multiplexing processing is performed, multiplexed frequency characteristics may be lost. Therefore, in the second example embodiment, an additional information multiplexing unit 318 performs multiplexing processing with use of pre-color-conversion multiplexing parameters 317 generated by a parameter conversion unit 316 converting the multiplexing parameters 315. As a result, it is possible to prevent multiplexed frequency characteristics from being lost even if color conversion is performed after multiplexing processing.

For example, when input YUV components are "(144, −64, −96)" in the multiplexing parameters 315 illustrated in FIG. 7, YUV components with U application values applied thereto when the mask patterns are "0", "2", and "−1" are assumed to become "(144, −64, −96)", "(144, −54, −96)", and "(144, −74, −96)", respectively. These components are converted into RGB values by the above-mentioned formulae (4), (5), and (6) and thus become "(9, 235, 31)", "(9, 231, 48)", and "(9, 238, 13)".

These RGB values are used to calculate pre-color-conversion RGB values with use of the parameter conversion unit 316 and the color conversion table 311. The method of calculating pre-color-conversion RGB values to be used can be a general method.

For example, in a case where a color conversion table is used, pre-color-conversion RGB values can be calculated by performing inverse conversion according to a mapping method using the color conversion table or by performing interpolation processing such as tetrahedral interpolation on post-color-conversion RGB values of the color conversion table.

With the above-mentioned example used, pre-color-conversion RGB values are calculated from post-color-conversion RGB values in such a way as to become "(5, 250, 27)", "(6, 249, 40)", and "(9, 250, 3)". Such a conversion is performed on YUV values of 4,913 grid points of the multiplexing parameters 315 illustrated in FIG. 7, and three sets of pre-color-conversion RGB values are calculated and converted into a table, so that pre-color-conversion multiplexing parameters 317 such as those in a table illustrated in FIG. 20 can be created.

Figure 18:
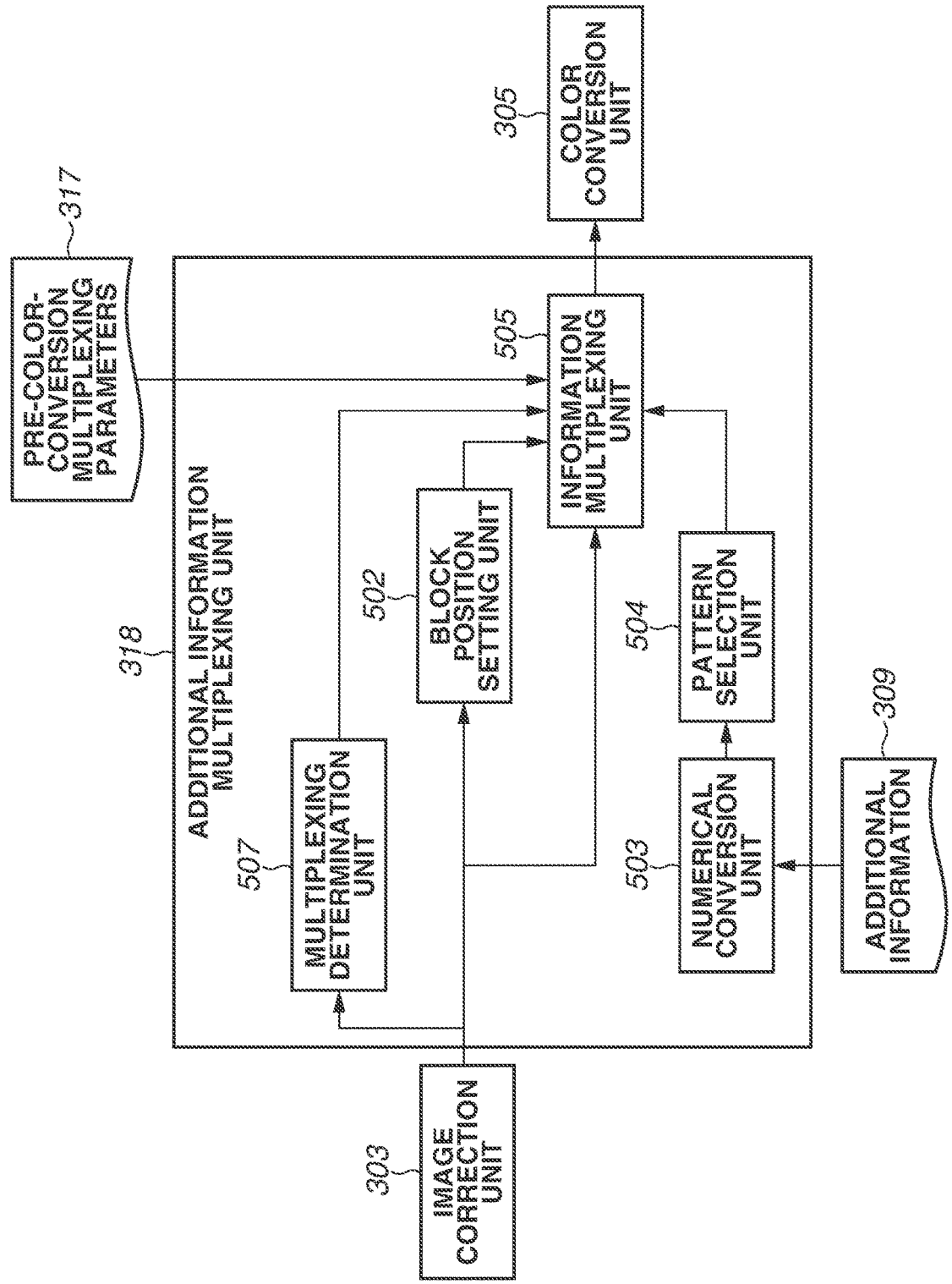
FIG. 18 is a diagram illustrating a block configuration of firmware for additional information multiplexing processing.

Multiplexing processing according to the second example embodiment is described with reference to FIG. 18. While, in the first example embodiment, an RGB image is converted into a YUV image by the color space conversion unit 501, in the second example embodiment, an RGB image is used. Thus, an image with multiplexing processing performed thereon is generated by executing the block position setting unit 502 and the information multiplexing unit 505 with respect to each plane of an RGB image without performing color space conversion. After that, in response to color conversion being performed by the color conversion unit 305, respective RGB values of mask patterns become "(9, 235, 31)", "(9, 231, 48)", and "(9, 238, 13)". Then, YUV values at that time become "(144, −64, −96)", "(144, −54, −96)", and "(144, −74, −96)".

In this way, according to the second example embodiment, since, even if multiplexing processing is performed on an RGB image obtained before color conversion, modulation of colors for multiplexing is never lost, it is possible to appropriately extract additional information from a printed product. Furthermore, the second example embodiment can be configured in combination with the first example embodiment. In that case, a configuration including both the processing units illustrated in FIG. 3 and the processing units illustrated in FIG. 17 and capable of selectively performing one of operations of the first example embodiment and the second example embodiment can be employed.

In the second example embodiment, the pre-color-conversion multiplexing parameters 317 are created by converting the multiplexing parameters 315. However, previously created multiplexing parameters 317 can be stored in a storage unit such as the ROM 1903 and, at the time of performing multiplexing processing, the stored multiplexing parameters 317 can be read out for use in performing multiplexing processing. Moreover, in the second example embodiment, multiplexing processing is performed in an RGB color space, but can be performed in another type of color space, such as a CMYK color space.

For example, in the case of a printing machine for, for example, offset printing, processing in a CMYK color space is performed at the time of color conversion. Since, even in color conversion in CMYK, non-linear color conversion is performed, frequency characteristics are disadvantageously lost as with RGB. Accordingly, as is the case in RGB, an operation in the second example embodiment can be implemented by calculating pre-color-conversion CMYK values. Moreover, an operation in the second example embodiment can be implemented even in a case where an RGB or CMYK color space has been converted into a color space, such as Lab, YUV, YCbCr, or Lch, according to a predetermined arithmetic equation.

Figure 22:
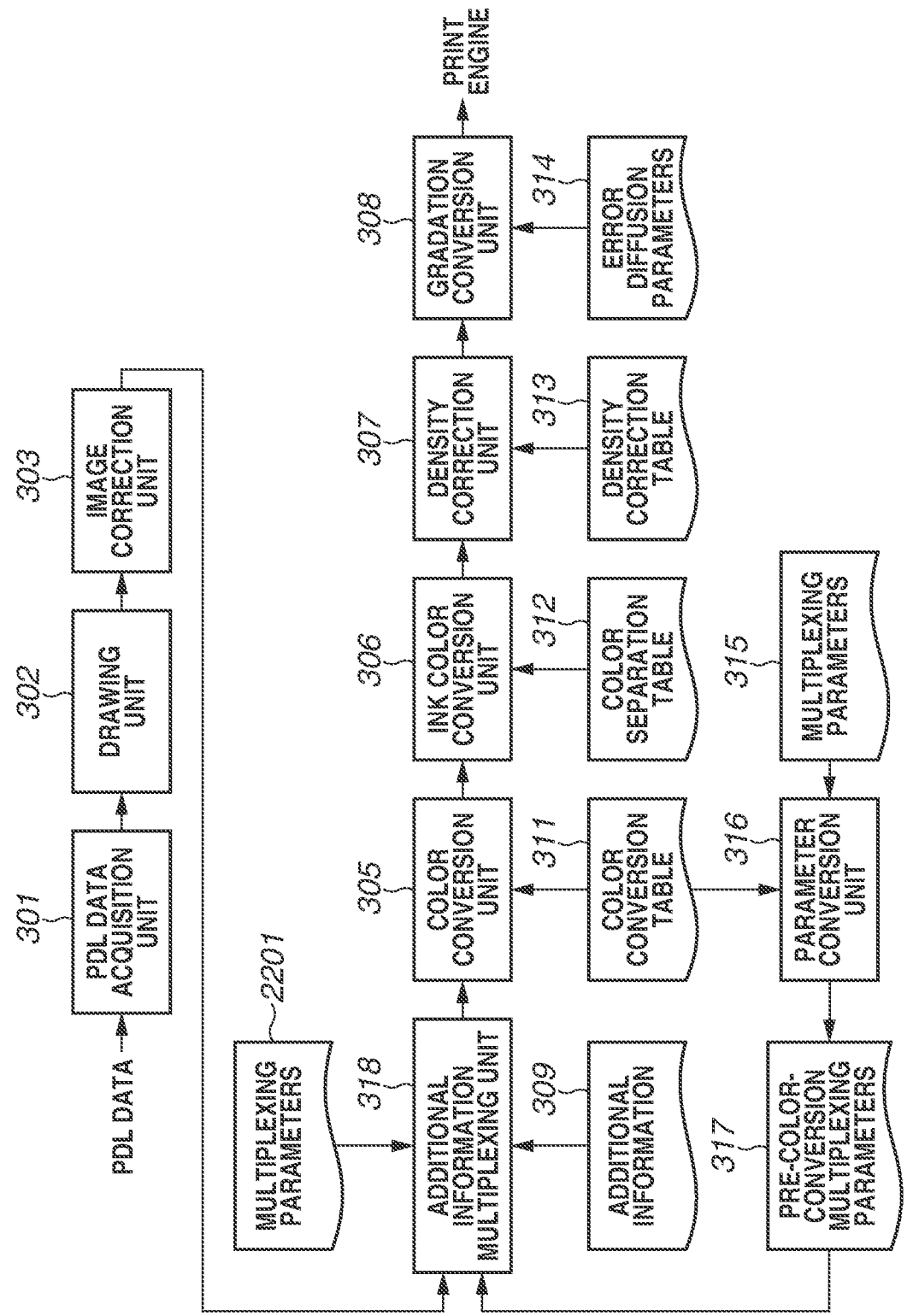
FIG. 22 is a diagram illustrating a block configuration of firmware for multiplexing encode processing.

In the following description, a third example embodiment is described with regard to differences from the second example embodiment. FIG. 22 is a diagram illustrating a block configuration of basic firmware for multiplexing encode processing according to the third example embodiment. Blocks assigned the respective same reference numerals as those in the block diagram of FIG. 3 are the respective same blocks described with reference to FIG. 3 and are, therefore, omitted from description here.

In the third example embodiment, multiplexing processing on a non-printing area is also performed by an additional information multiplexing unit 318 located at a stage prior to the color conversion unit 305. Moreover, multiplexing parameters 2201 are multiplexing parameters to be used for multiplexing processing for a non-printing area. FIG. 24 illustrates multiplexing parameters to be used for multiplexing processing for a non-printing area in the third example embodiment. The multiplexing parameters illustrated in FIG. 24 include only RGB application values at the time of the mask parameter being "0" and "−1" and RGB application values at the time of the mask parameter being "2". In the multiplexing parameters 2201, when input RGB values indicating white pixels representing a non-printing area are "(255, 255, 255)", to cause yellow, which is an ink color unlikely to be visually conspicuous and is the highest in brightness, to be printed, only signals of B, which is a color complementary to yellow, are decreased.

Figure 23:
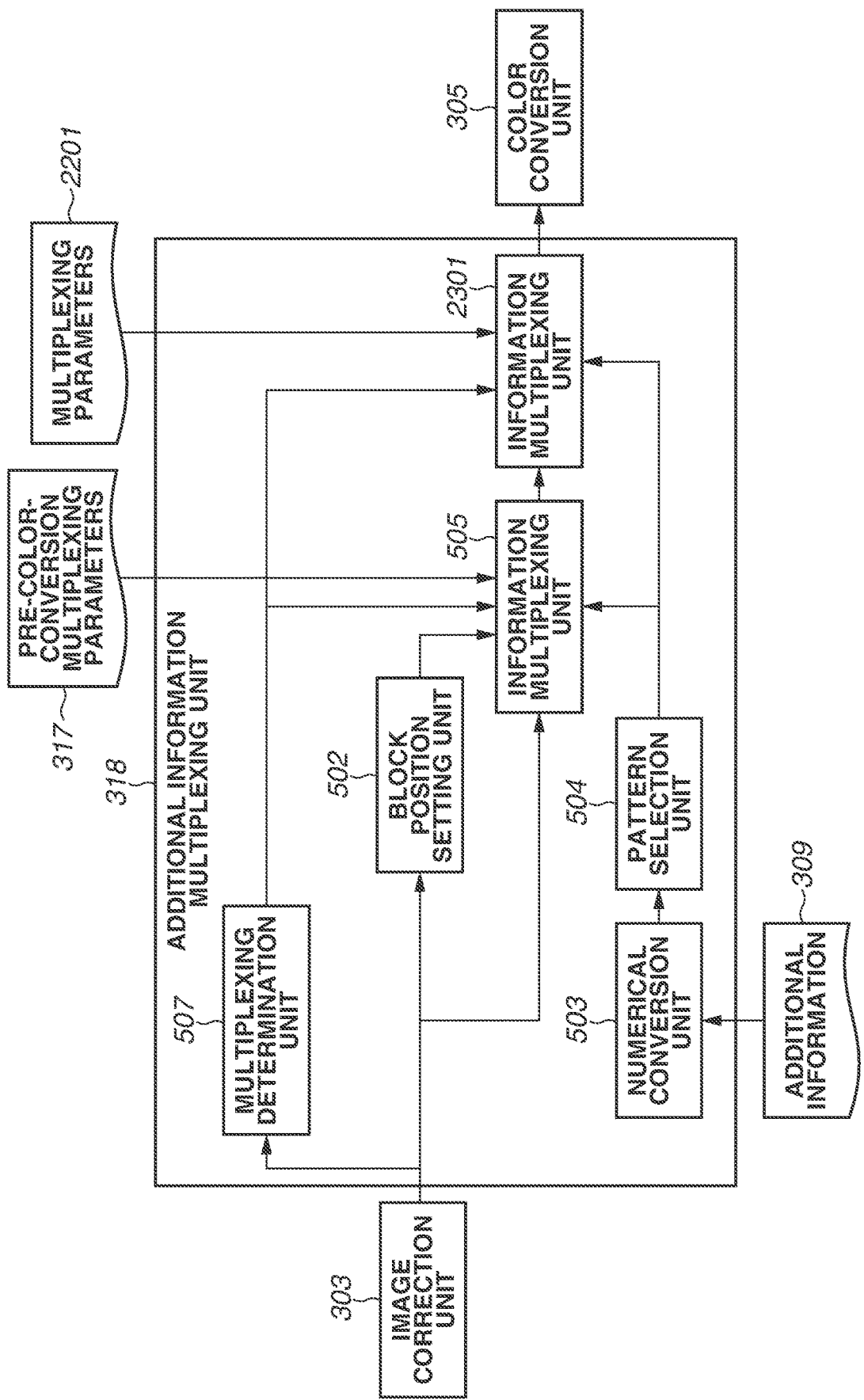
FIG. 23 is a diagram illustrating a block configuration of firmware for additional information multiplexing processing.

Multiplexing processing according to the third example embodiment is described with reference to FIG. 23. While, in the second example embodiment, multiplexing processing in only a printing area is performed on an RGB image, in the third example embodiment, multiplexing processing in a non-printing area is performed on an RGB image.

An information multiplexing unit 2301 acquires image data with multiplexing processing performed thereon by the information multiplexing unit 505, and acquires pixels on which to perform multiplexing processing set by the multiplexing determination unit 507. Additionally, the information multiplexing unit 2301 acquires mask patterns for the respective numerical values selected by the pattern selection unit 504. Additionally, the information multiplexing unit 2301 acquires the above-mentioned multiplexing parameters 2201. The information multiplexing unit 2301 generates an image obtained by applying the mask patterns to image data from the acquired pieces of information. To perform multiplexing processing in a non-printing area, the information multiplexing unit 2301 performs multiplexing processing on all of the pixels excluding the pixels set by the multiplexing determination unit 507. In the multiplexing parameters 2201 illustrated in FIG. 24, when input RGB values are "(255, 255, 255)", RGB values with RGB application values applied thereto when the mask patterns are "0", "2", and "−1" become "(255, 255, 255)", "(255, 255, 230)", and "(255, 255, 255)", respectively.

In this way, in the third example embodiment, it is possible to perform processing for information multiplexing in the same color space with respect to both a printing area and a non-printing area.

OTHER EMBODIMENTS

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2021-020974 filed Feb. 12, 2021, which is hereby incorporated by reference herein in its entirety.

What is claimed is:

1. An information processing apparatus comprising:
    a determination unit configured to determine a printing area and a non-printing area in image data; and
    an execution unit configured to execute first multiplexing processing by changing a U component in a YUV color space with respect to an area determined as a printing area in the image data and to execute second multiplexing processing by changing a Y component in a CMYK color space with respect to an area determined as a non-printing area in the image data.

2. The information processing apparatus according to claim 1, wherein the second multiplexing processing is multiplexing processing for changing a Y component in a YUV color space to a larger extent than the first multiplexing processing.

3. The information processing apparatus according to claim 1, wherein both the first multiplexing processing and the second multiplexing processing are processing for multiplexing identical additional information.

4. A control method for an information processing apparatus, the control method comprising:

determine a printing area and a non-printing area in image data;

executing first multiplexing processing by changing a U component in a YUV color space with respect to an area determined as a printing area in the image data; and executing second multiplexing processing by changing a Y component in a CMYK color space with respect to an area determined as a non-printing area in the image data.

5. The control method for the information processing apparatus according to claim 4, wherein the second multiplexing processing is multiplexing processing for changing a Y component in a YUV color space to a larger extent than the first multiplexing processing.

6. The control method for the information processing apparatus according to claim 4, wherein both the first multiplexing processing and the second multiplexing processing are processing for multiplexing identical additional information.

7. A non-transitory computer-readable storage medium storing computer-executable instructions that, when executed by a computer, cause the computer to perform a control method for an information processing apparatus, the control method comprising:

determine a printing area and a non-printing area in image data;

executing first multiplexing processing by changing a U component in a YUV color space with respect to an area determined as a printing area in the image data; and executing second multiplexing processing by changing a Y component in a CMYK color space with respect to an area determined as a non-printing area in the image data.

* * * * *